United States Patent
Wentworth et al.

(10) Patent No.: US 7,551,827 B2
(45) Date of Patent: Jun. 23, 2009

(54) CABLE EXIT TROUGH WITH INSERT

(75) Inventors: Michael J. Wentworth, Belle Plaine, MN (US); Brian L. Johnson, Maple Grove, MN (US); Wayne Johnson, Rosemount, MN (US); Thomas W. Kampf, Minnetonka, MN (US); Alex Watts, Minnetonka, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/605,849

(22) Filed: Nov. 29, 2006

(65) Prior Publication Data

US 2007/0230888 A1 Oct. 4, 2007

Related U.S. Application Data

(63) Continuation of application No. 11/137,125, filed on May 25, 2005, now Pat. No. 7,155,104, which is a continuation of application No. 10/890,417, filed on Jul. 12, 2004, now Pat. No. 6,915,056, which is a continuation of application No. 10/622,501, filed on Jul. 18, 2003, now Pat. No. 6,763,169, which is a continuation of application No. 09/680,700, filed on Oct. 6, 2000, now Pat. No. 6,625,373.

(51) Int. Cl.
 *G02B 6/00* (2006.01)
(52) U.S. Cl. ..................................... 385/134
(58) Field of Classification Search ......... 385/134–137; 174/97
 See application file for complete search history.

(56) References Cited

U.S. PATENT DOCUMENTS

| | | | |
|---|---|---|---|
| 5,067,678 A | 11/1991 | Henneberger et al. | |
| 5,160,811 A | 11/1992 | Ritzmann | |
| 5,161,580 A | 11/1992 | Klug | |
| 5,240,209 A | 8/1993 | Kutsch | |
| 5,271,585 A | 12/1993 | Zetena, Jr. | |
| 5,316,243 A | 5/1994 | Henneberger | |
| 5,316,244 A | 5/1994 | Zetena, Jr. | |
| 5,335,349 A | 8/1994 | Kutsch et al. | |

(Continued)

FOREIGN PATENT DOCUMENTS

DE 37 42 448 A1 6/1989

(Continued)

OTHER PUBLICATIONS

ADC Telecommunications brochure entitled "FiberGuide® , Fiber Management Systems," 33 pages, dated Oct. 1995.

(Continued)

*Primary Examiner*—Hae Moon Hyeon
(74) *Attorney, Agent, or Firm*—Merchant & Gould P.C.

(57) ABSTRACT

A cable exit trough defining an insert aperture for receiving a modular cable management inserts. The modular insert providing an additional cable management device such as a curved guidewall. The cable management device may alternatively be fixed to the cable exit trough. Removable snap-mounted flanges may also be included in the exit trough. The exit trough may also include an exit cover having a cover plate and a pivot plate hingedly mounted thereto for easy access to the trough.

90 Claims, 20 Drawing Sheets

U.S. PATENT DOCUMENTS

| | | |
|---|---|---|
| 5,394,502 A | 2/1995 | Caron |
| 5,399,814 A | 3/1995 | Staber et al. |
| 5,503,354 A | 4/1996 | Lohf et al. |
| 5,683,211 A | 11/1997 | Gordon |
| 5,752,781 A | 5/1998 | Haataja et al. |
| 5,753,855 A | 5/1998 | Nicoli et al. |
| 5,872,336 A | 2/1999 | Long |
| 5,917,982 A | 6/1999 | Vargas et al. |
| 5,923,753 A | 7/1999 | Haataja et al. |
| 5,937,131 A | 8/1999 | Haataja et al. |
| 5,995,699 A | 11/1999 | Vargas et al. |
| 6,002,089 A | 12/1999 | Hemingway et al. |
| 6,037,538 A | 3/2000 | Brooks |
| 6,044,194 A | 3/2000 | Meyerhoefer |
| 6,076,779 A | 6/2000 | Johnson |
| 6,415,091 B1 | 7/2002 | Daub et al. |
| 6,535,683 B1 | 3/2003 | Johnson et al. |
| 6,546,179 B2 | 4/2003 | Petri |
| 6,625,373 B1 | 9/2003 | Wentworth et al. |
| 6,708,918 B2 | 3/2004 | Ferris et al. |
| 6,763,169 B2 | 7/2004 | Wentworth et al. |
| 6,915,056 B2 | 7/2005 | Wentworth et al. |
| 7,155,104 B2 | 12/2006 | Wentworth et al. |
| 2003/0165316 A1 | 9/2003 | Johnson et al. |

FOREIGN PATENT DOCUMENTS

| | | |
|---|---|---|
| EP | 1 006 383 A1 | 6/2000 |

OTHER PUBLICATIONS

Warren & Brown & Staff brochure pages entitled "light-paths," Issue 2, 11 pages, dated 1995.

ADC Telecommunications brochure entitled "FiberGuide™ Fiber Management System," 6 pages, dated Jun. 1989.

ADC Telecommunications brochure entitled "ADC FiberGuide® System Express Exit™ 2.2," pages, dated May 1999.

ADC Telecommunications brochure entitled "FiberGuide® Fiber Management Systems," 37 pages, dated Jun. 1998.

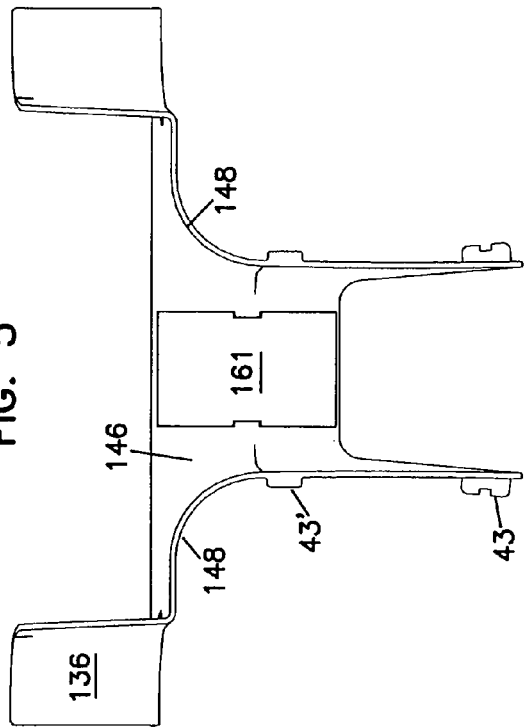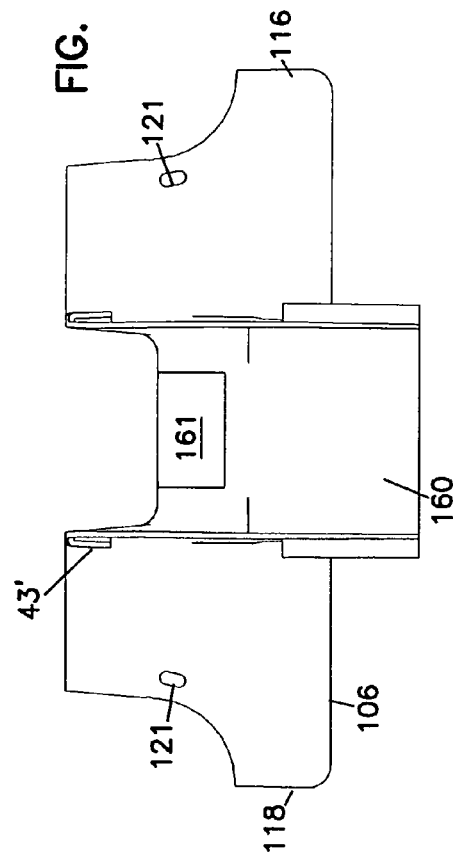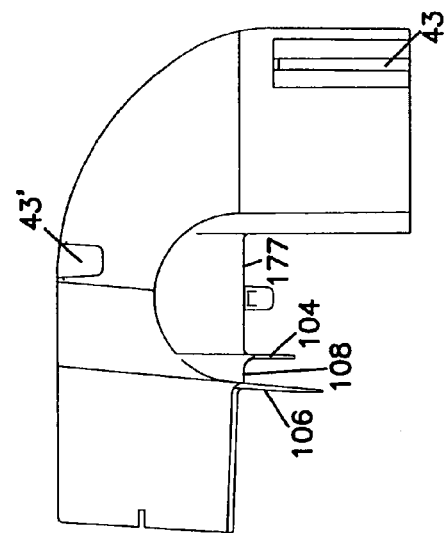

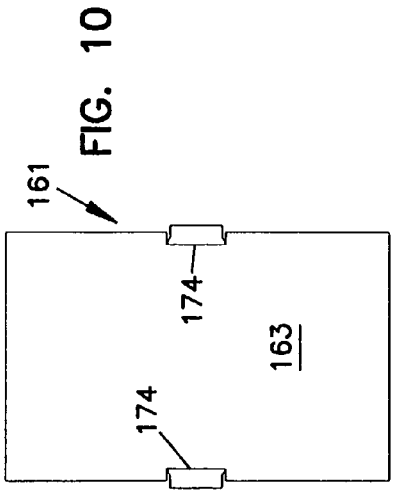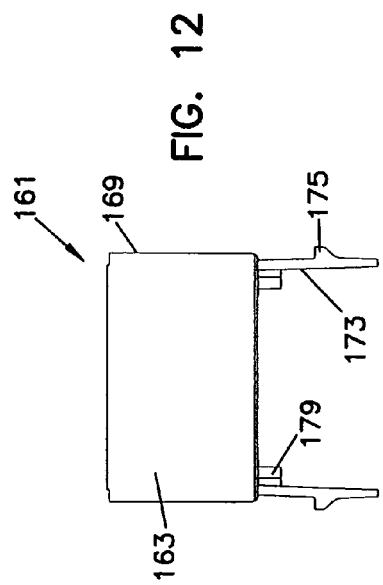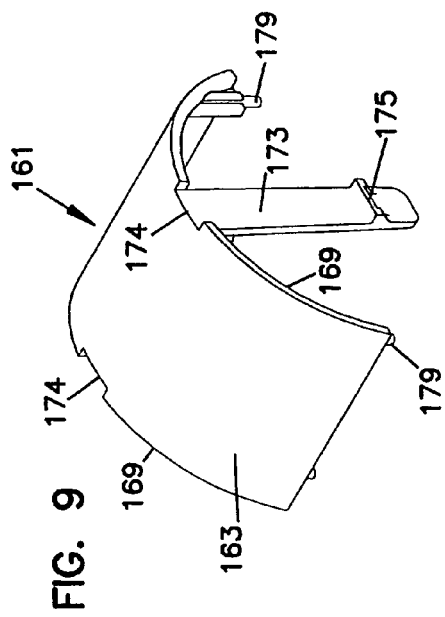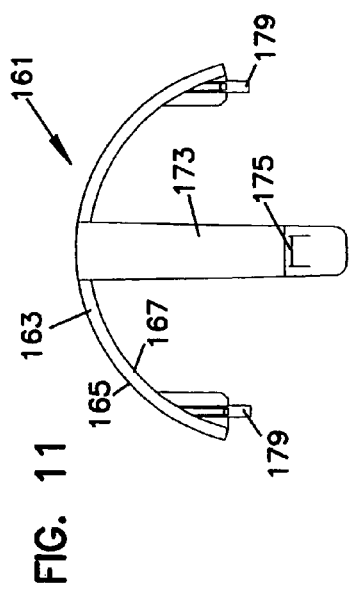

FIG. 13
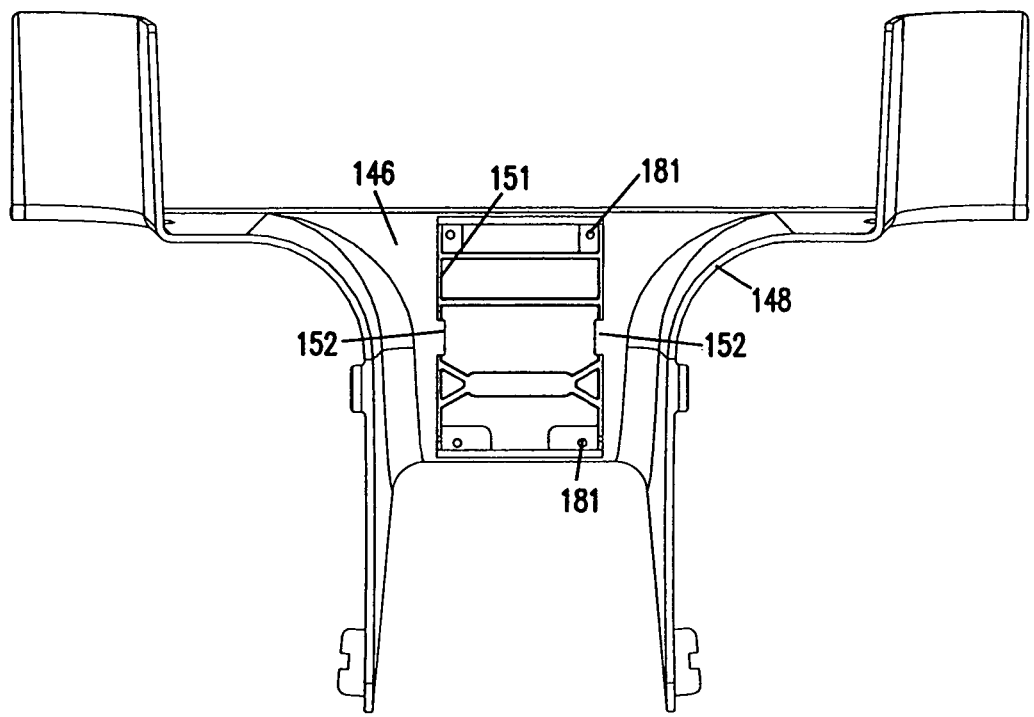
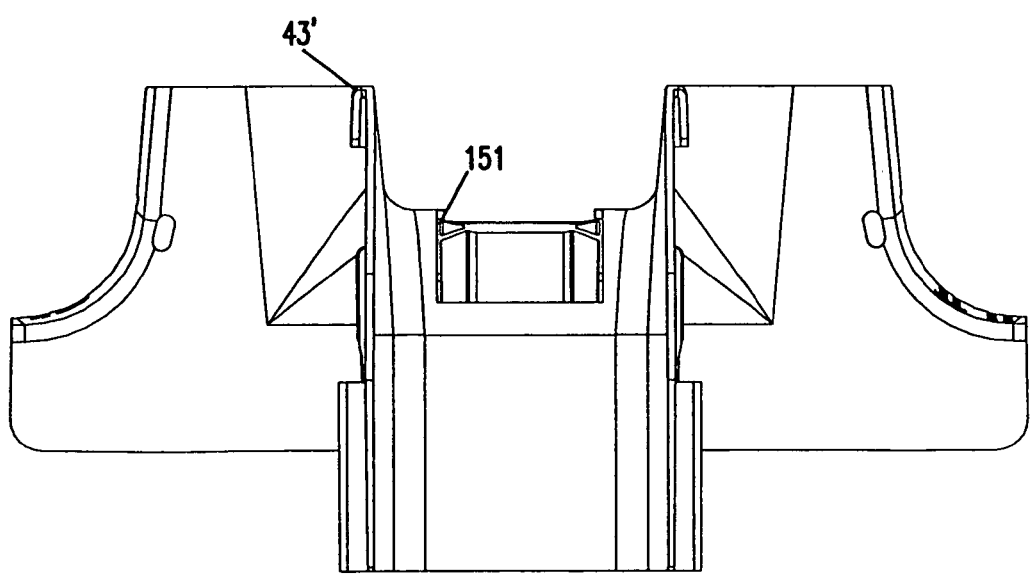
FIG. 14

FIG. 16
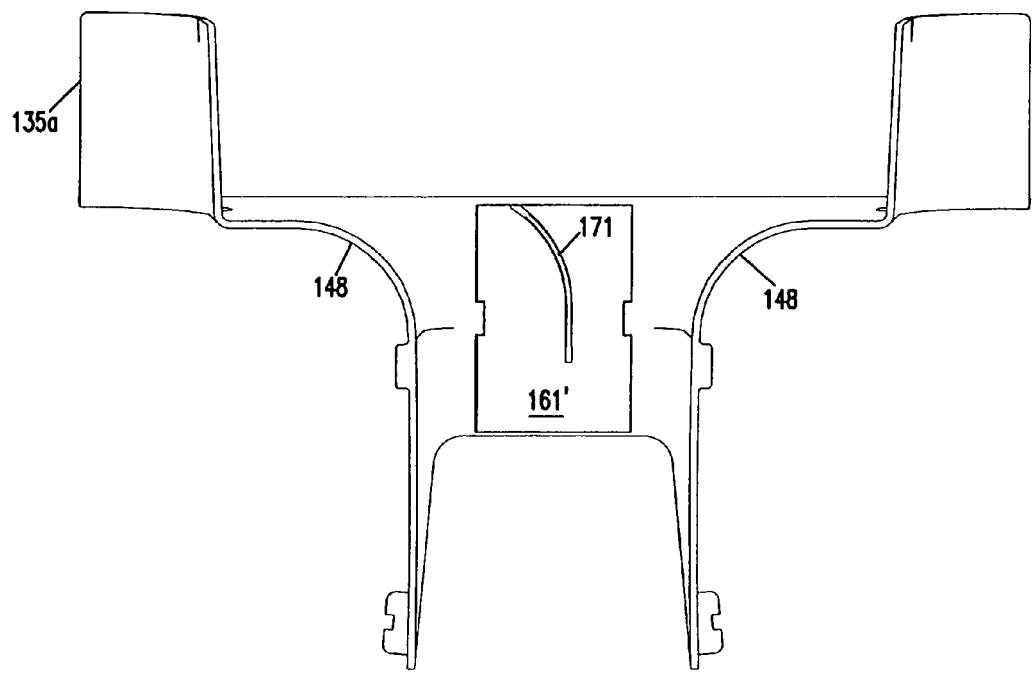
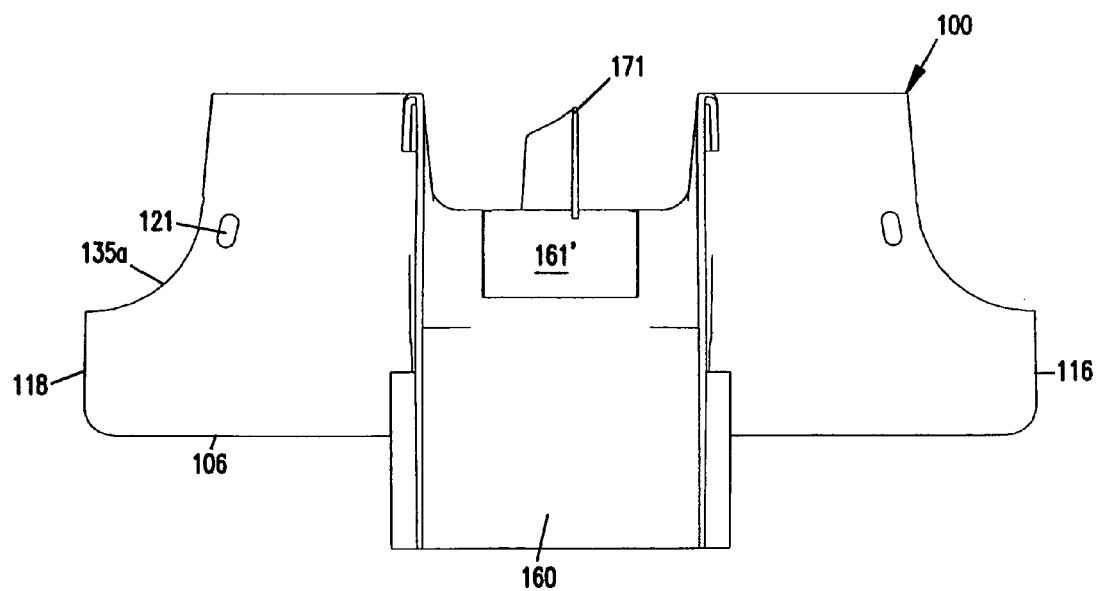
FIG. 17

FIG. 19
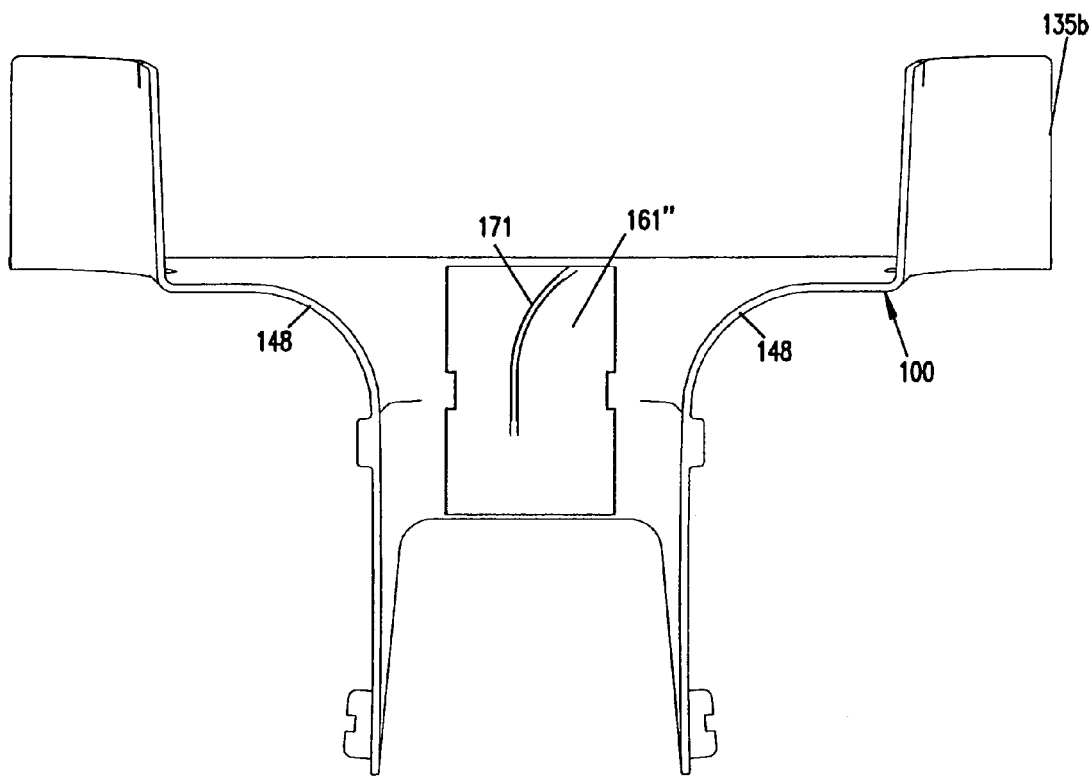
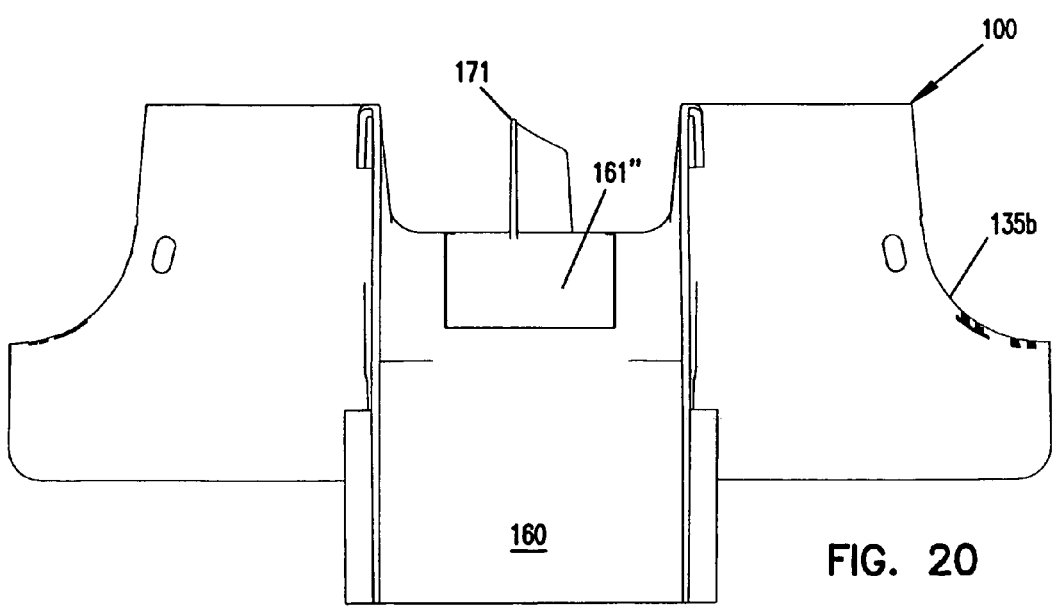
FIG. 20

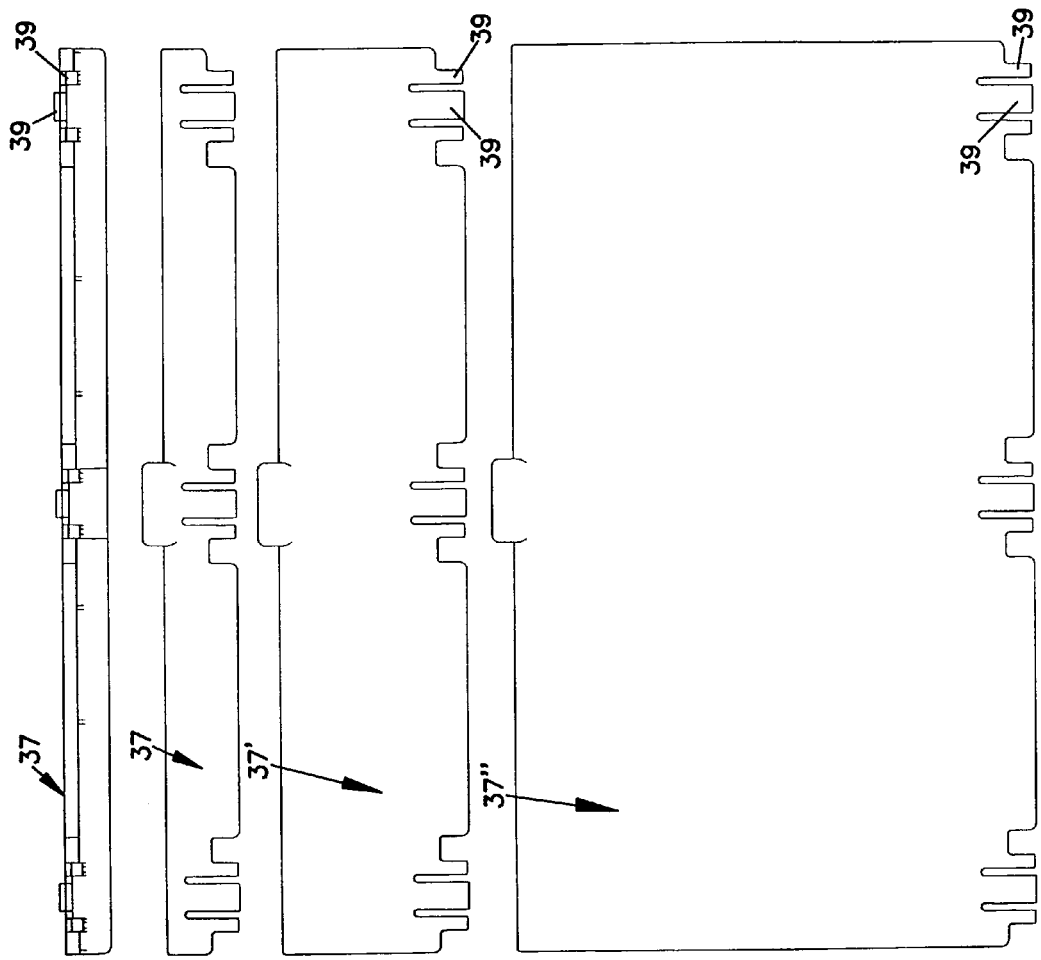
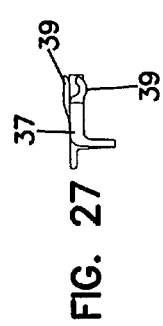
FIG. 27
FIG. 28
FIG. 29
FIG. 30
FIG. 31

CABLE EXIT TROUGH WITH INSERT

CROSS-REFERENCE TO RELATED APPLICATIONS

This application is a continuation of application Ser. No. 11/137,125, filed May 25, 2005 now U.S. Pat. No. 7,155,104; which is a continuation of application Ser. No. 10/890,417, filed Jul. 12, 2004, now U.S. Pat. No. 6,915,056; which is a continuation of application Ser. No. 10/622,501, filed Jul. 18, 2003, now U.S. Pat. No. 6,763,169, which is a continuation of application Ser. No. 09/680,700, filed Oct. 6, 200, now U.S. Pat. No. 6,625,373; which application(s) are incorporated herein by reference.

FIELD OF THE INVENTION

The invention pertains to systems for the management and routing of optical fiber cables.

BACKGROUND OF THE INVENTION

In the telecommunications industry, the use of optical fibers for signal transmission is accelerating. With the increased utilization of optical fiber systems, optical fiber cable management requires industry attention.

On area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable that any routing system will be readily modifiable and adaptable to changes in equipment needs. Accordingly a routing system is not practical which would require a high capital outlay and which could not be readily adapted to changes in a customer's needs. Namely, if routing paths, once established, are forever fixed, the system cannot adapt. Also, and perhaps most important, any routing system must protect optical fibers from damage. In the use of optical fibers, it is recognized that the fibers should not bend beyond a minimum radius of curvature. For example, it is commonly recognized that optical fibers should not be bent in a radius of less than 1.5 inches. U.S. Pat. No. 5,937,131 discloses an optical cable exit trough addressing some of these concerns, however, there remains room for improvement.

SUMMARY OF THE INVENTION

According to preferred embodiments of the present invention, a cable routing system is disclosed for routing optical fiber cables between optical transmission equipment. The system includes a lateral trough section configured for defining a cable pathway. An exit trough is mountable to the lateral trough section to provide a cable exit pathway from the lateral trough section. The exit trough includes a bracket portion mountable to a top edge of the lateral trough section. Two curved lead-ins on opposite ends of the bracket portion each define a cable pathway leading to an exit trough portion extending from a middle of the bracket portion in a direction away from the lateral trough section. The exit trough portion includes a convexly curved bottom trough surface, two convexly curved upstanding sides on opposite sides of the bottom trough surface, and an upstanding guidewall for cable management.

In one embodiment, the exit trough includes an aperture for receiving a removable insert. The removable insert includes a major surface forming a portion of the bottom trough surface of the exit trough. The removable insert may include an upstanding guidewall for cable management.

The exit trough defines a cable pathway leading upwardly and away from the lateral trough section. The exit trough is mountable to the lateral trough section without modification to the lateral trough section. The exit trough can be placed generally at any location along the lateral trough section, and can be placed during initial system setup, or at a later time as the need arises for an exit pathway from the lateral trough section, such as when new optical transmission equipment is added to the system. The exit trough may include a downspout portion defining a downwardly directed cable pathway, or other directional pathway as desired. The insert with guidewall allows for cable management of the cables passing from the lateral trough section to the downspout or other directional pathway element.

In one preferred embodiment, the lead-in portions of the exit trough are configured to receive removable flanges for improved cable management.

In a further preferred embodiment, the exit trough may be covered by an exit cover which includes a cover plate hingedly mounted to a pivot plate. The exit cover is disposed over the exit trough and the lateral trough section. The hingedly mounted pivot plate allows access to the lateral trough section without having to remove the entire cover.

BRIEF DESCRIPTION OF THE DRAWINGS

FIG. 5 is a top view of the exit trough of FIG. 4.

FIG. 6 is a front view of the exit trough of FIG. 4.

FIG. 7 is a side view of the exit trough of FIG. 4.

FIG. 9 is a perspective view of the modular insert shown in FIG. 8.

FIG. 10 is a top view of the modular insert of FIG. 9.

FIG. 11 is a side view of the modular insert of FIG. 9.

FIG. 12 is a front view of the modular insert of FIG. 9.

FIG. 13 is a top view of the exit trough of FIG. 8 with the insert piece removed, thereby exposing an insert aperture.

FIG. 14 is a front view of the exit trough of FIG. 13.

FIG. 16 is a top view of the exit trough of FIG. 15 with the modular insert piece placed within the exit trough according to the present invention.

FIG. 17 is a front view of the exit trough of FIG. 16.

FIG. 19 is a top view of the exit trough of FIG. 18 with the modular insert piece placed within the exit trough according to the present invention.

FIG. 20 is a front view of the exit trough of FIG. 19.

FIG. 27 is a side view of a pivot plate according to the present invention.

FIG. 28 is a front view of the pivot plate of FIG. 27.

FIG. 29 is a top view of the pivot plate of FIG. 27.

FIG. 30 is a top view of an alternative embodiment of a pivot plate according to the present invention.

FIG. 31 is a top view of another alternative embodiment of a pivot plate according to the present invention.

DETAILED DESCRIPTION OF THE PREFERRED EMBODIMENTS

Figure 1:
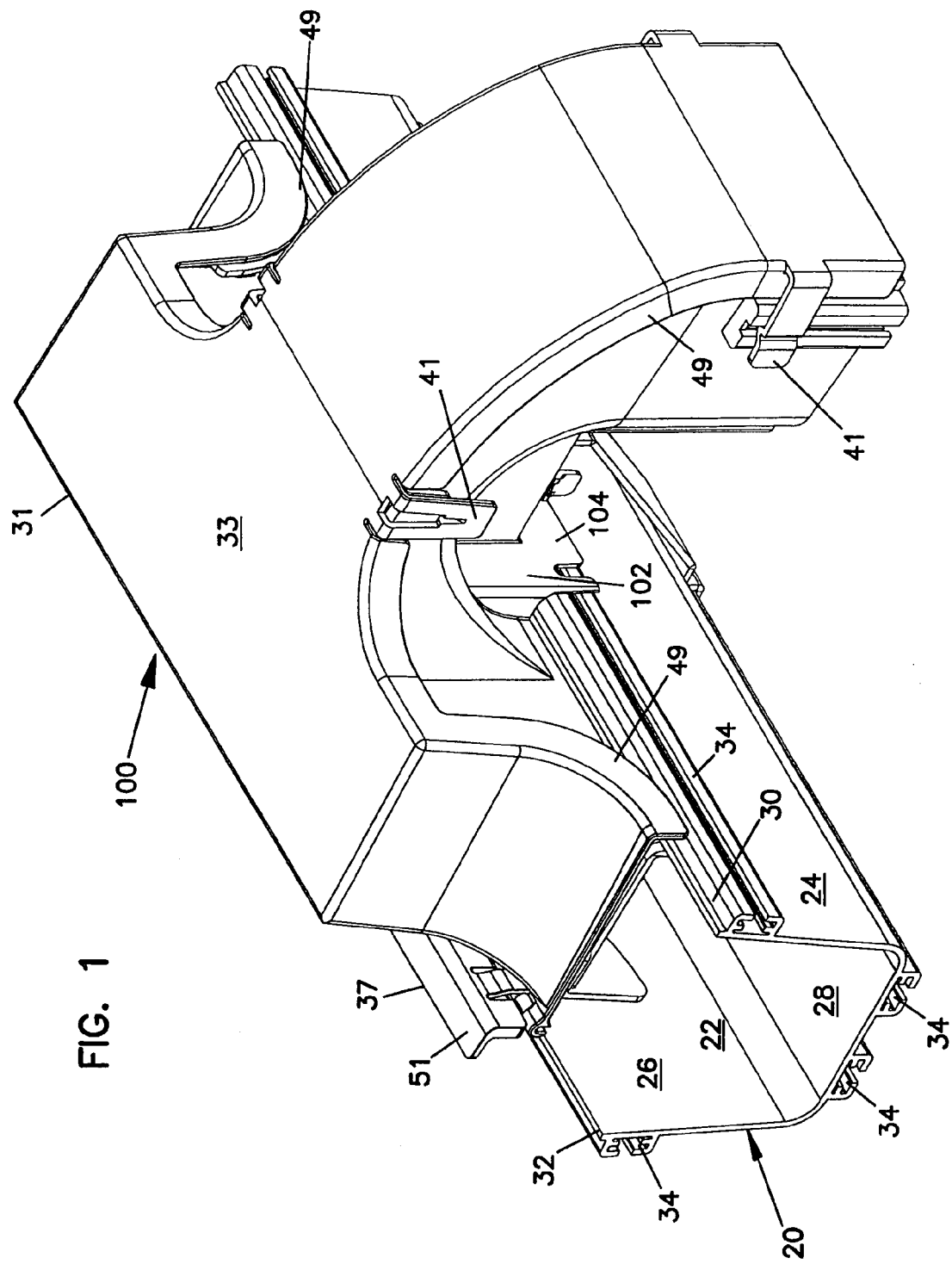
FIG. 1 shows a first perspective view of an exit trough assembly according to the present invention mounted to a lateral trough.
Figure 1A:
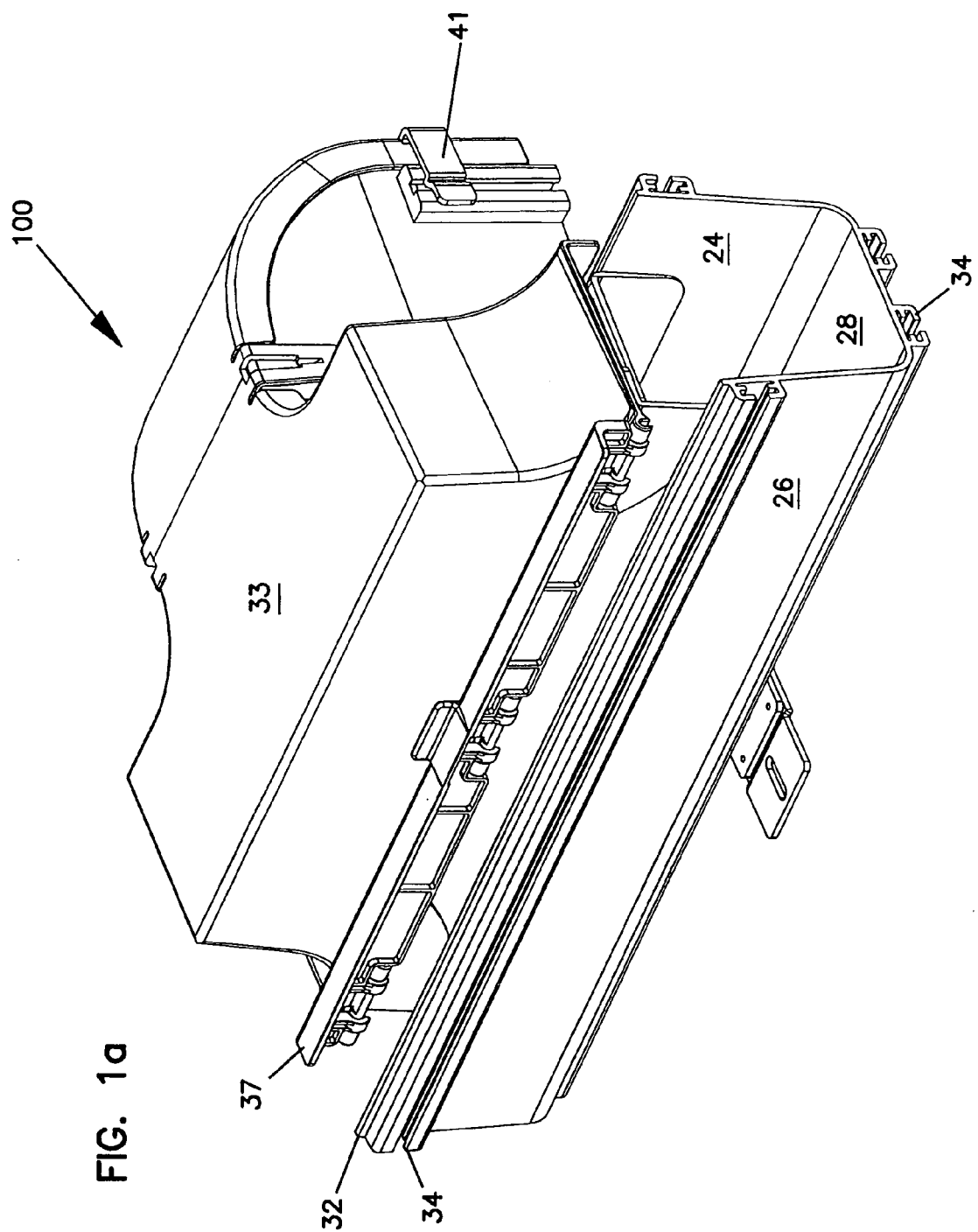
FIG. 1a is second perspective view of the exit trough assembly of FIG. 1.
Figure 1B:
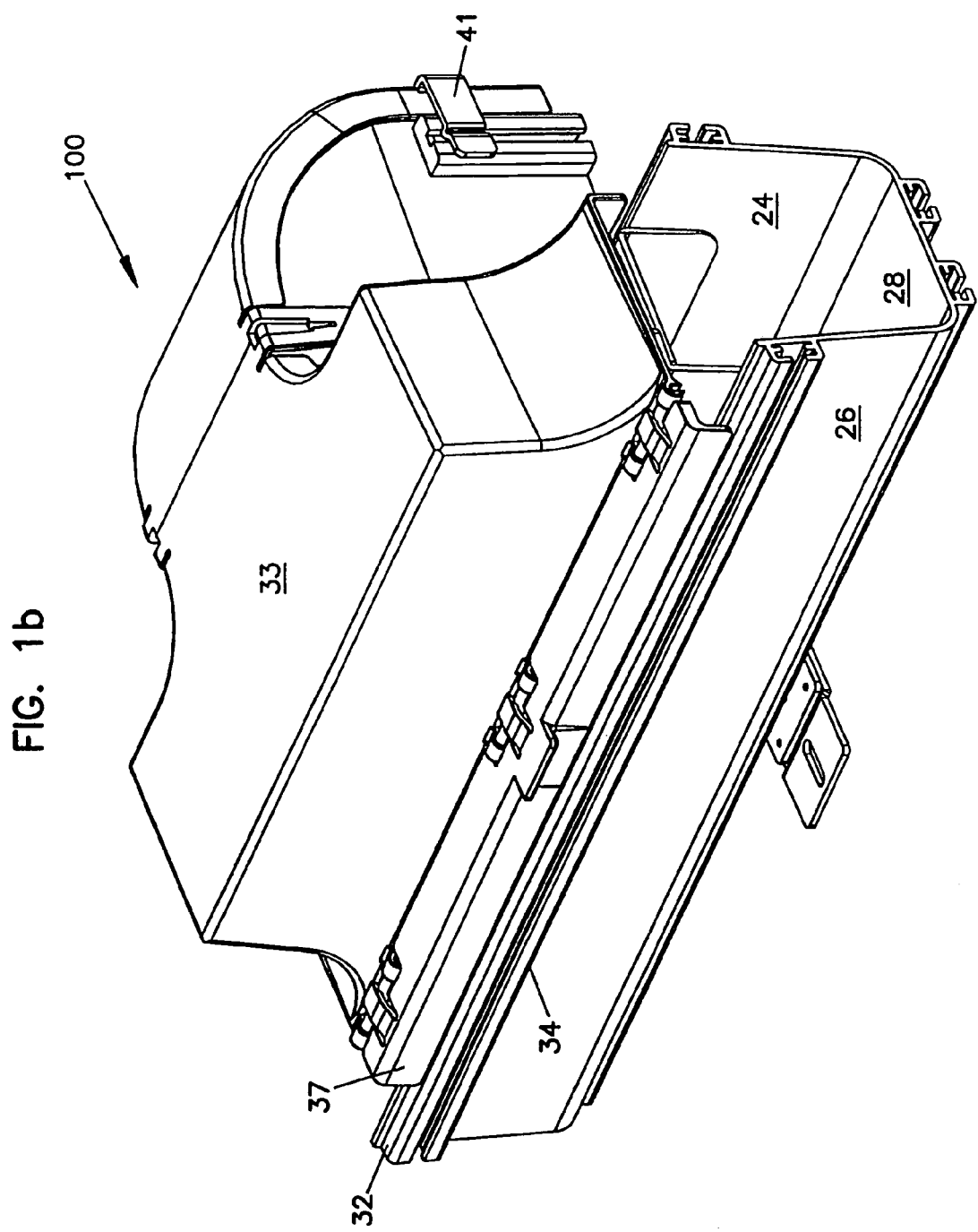
FIG. 1b is a perspective view of the exit trough assembly of FIG. 1a showing the pivot plate in a closed position.
Figure 2:
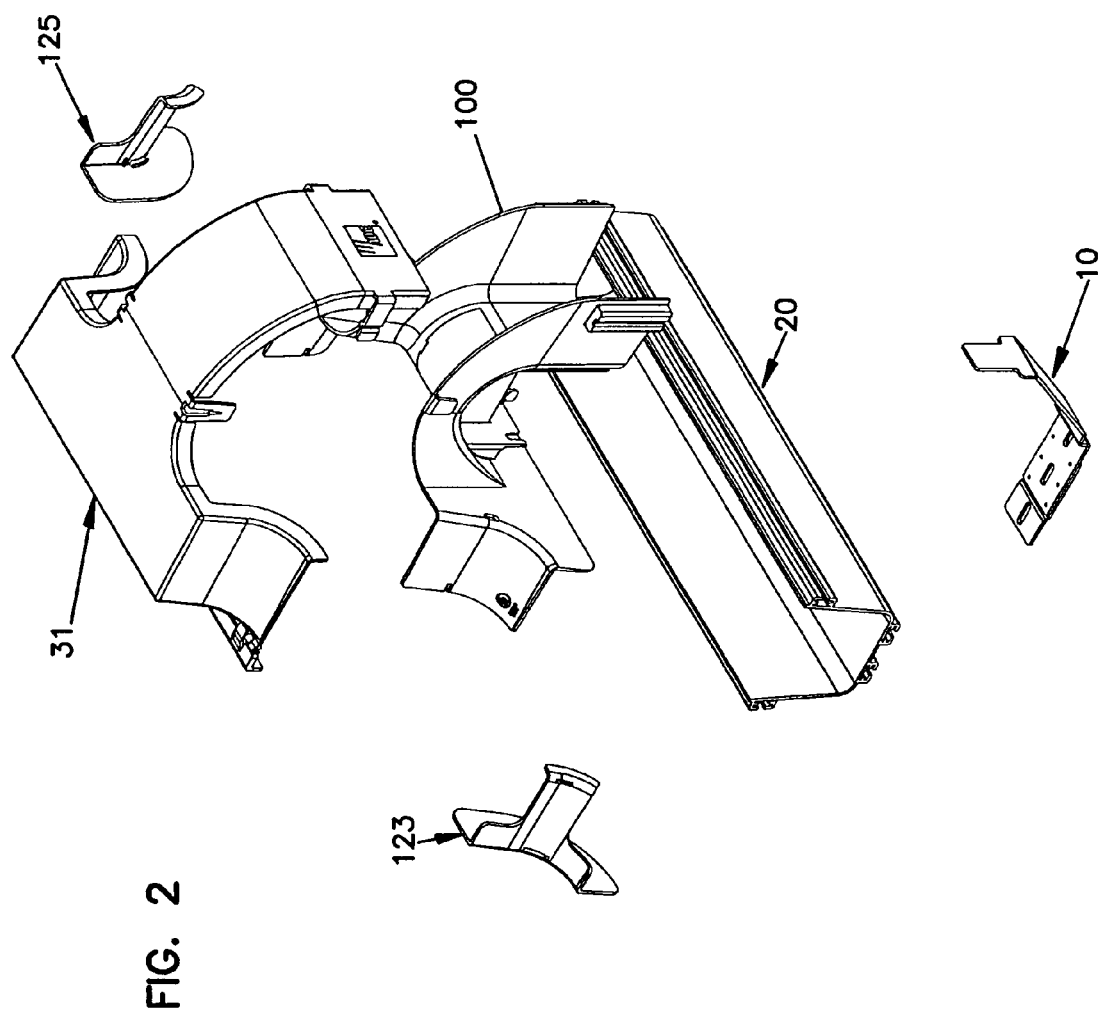
FIG. 2 shows a disassembled view of the exit trough assembly of FIG. 1.
Figure 3:
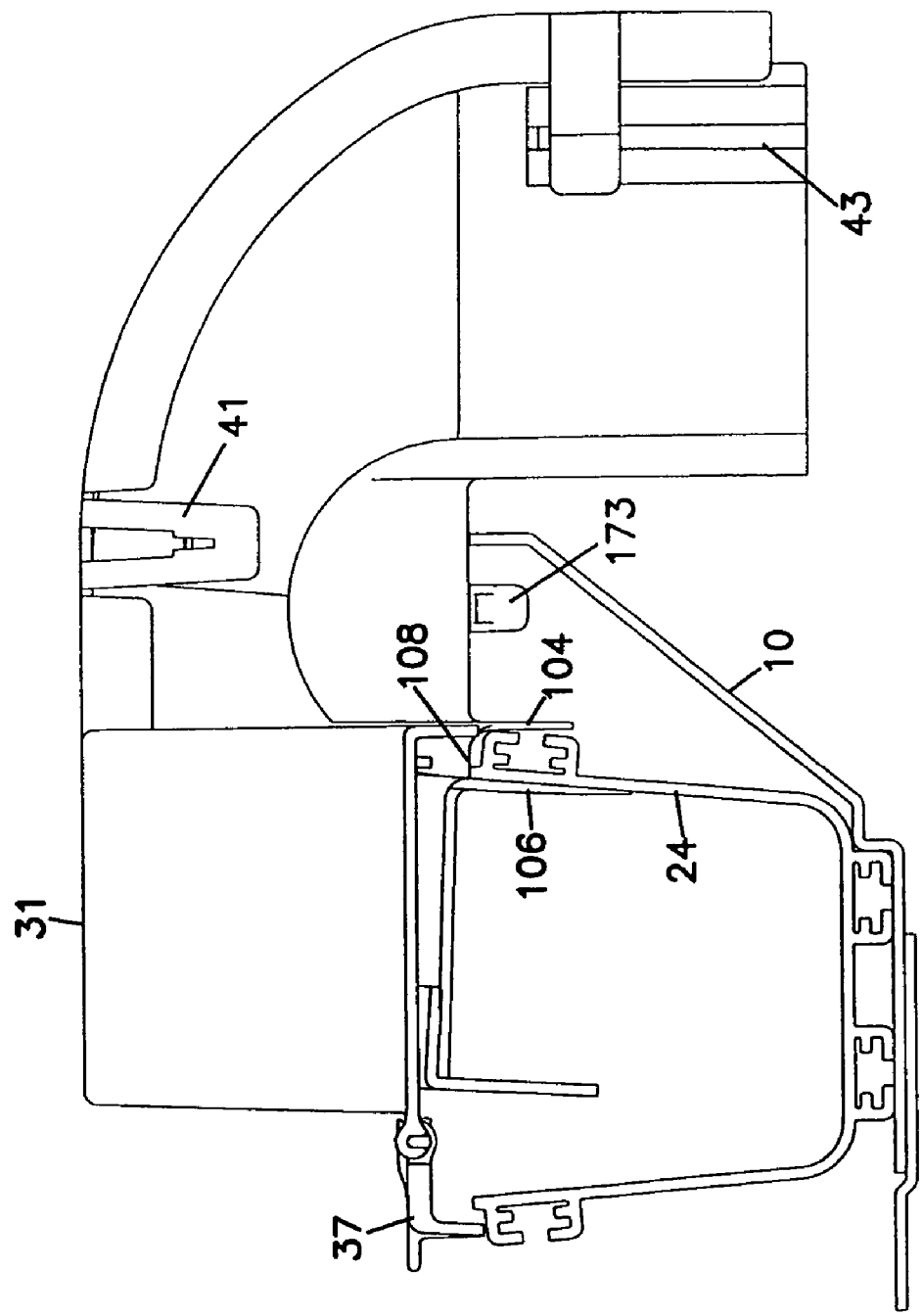
FIG. 3 is a side view of the exit trough assembly of FIG. 1.

Referring now to FIGS. 1-3, a first embodiment of an exit trough 100 is shown mounted to a lateral trough section 20. Lateral trough section 20 defines a cable pathway 22 for routing optical fiber cables between locations. Lateral trough section 20 and exit trough 100 can be part of a cable routing system typically within a structure, such as a building having optical fiber signal transmitting equipment. Lateral trough section 20 typically is suspended from a ceiling structure by any suitable means (not shown). U.S. Pat. Nos. 5,067,678 and 5,316,243 disclose various cable routing systems, including lateral trough sections like lateral trough section 20 illustrated in FIGS. 1-3. Exit trough 100 is not only usable with lateral trough section 20 shown in FIGS. 1-3, but also with other cable routing systems disclosed in U.S. Pat. Nos. 5,067,678 and 5,316,243, the disclosures of which are hereby incorporated by reference, and other cable routing systems. Exit trough 100 is an improvement over the exit troughs shown and described in U.S. Pat. No. 5,937,131, the disclosure of which is hereby incorporated by reference.

Generally, lateral trough section 20 includes first and second upstanding sides 24, 26, and a bottom 28 extending therebetween and defining cable pathway 22. Side 24 includes a top edge 30. Opposite side 26 also includes similar top edge 32. Lateral trough section 20 includes a plurality of attachment members 34 on an outside portion for use in attaching lateral trough sections 20 together end to end, or adding other system hardware.

As will be described below, exit trough 100 mounts to lateral trough section 20 adjacent to top edge 30 of side 24. Exit trough 100 creates a cable exit pathway from lateral trough section 20. Preferably, exit trough 100 mounts to lateral trough section 20 through attachment member 34, such as with a fastener.

Exit trough 100 includes a bracket portion 102 including an outer projecting member 104, an inner projecting member 106, and a connecting member 108. Bracket portion 102 generally defines a U-shape for receipt of a portion of side 24 such that top edge 30 is positioned adjacent to connecting member 108. Exit trough 100 conveniently and securely mounts to lateral trough section 20 via one or more fasteners positioned through outer projecting member 104 and engaged with attachment member 34 of lateral trough section 20. The exit trough 100 may also include a support arm 10 extending from the bottom side of the lateral trough section 20 to a point beneath the exit trough 100.

Figure 4:
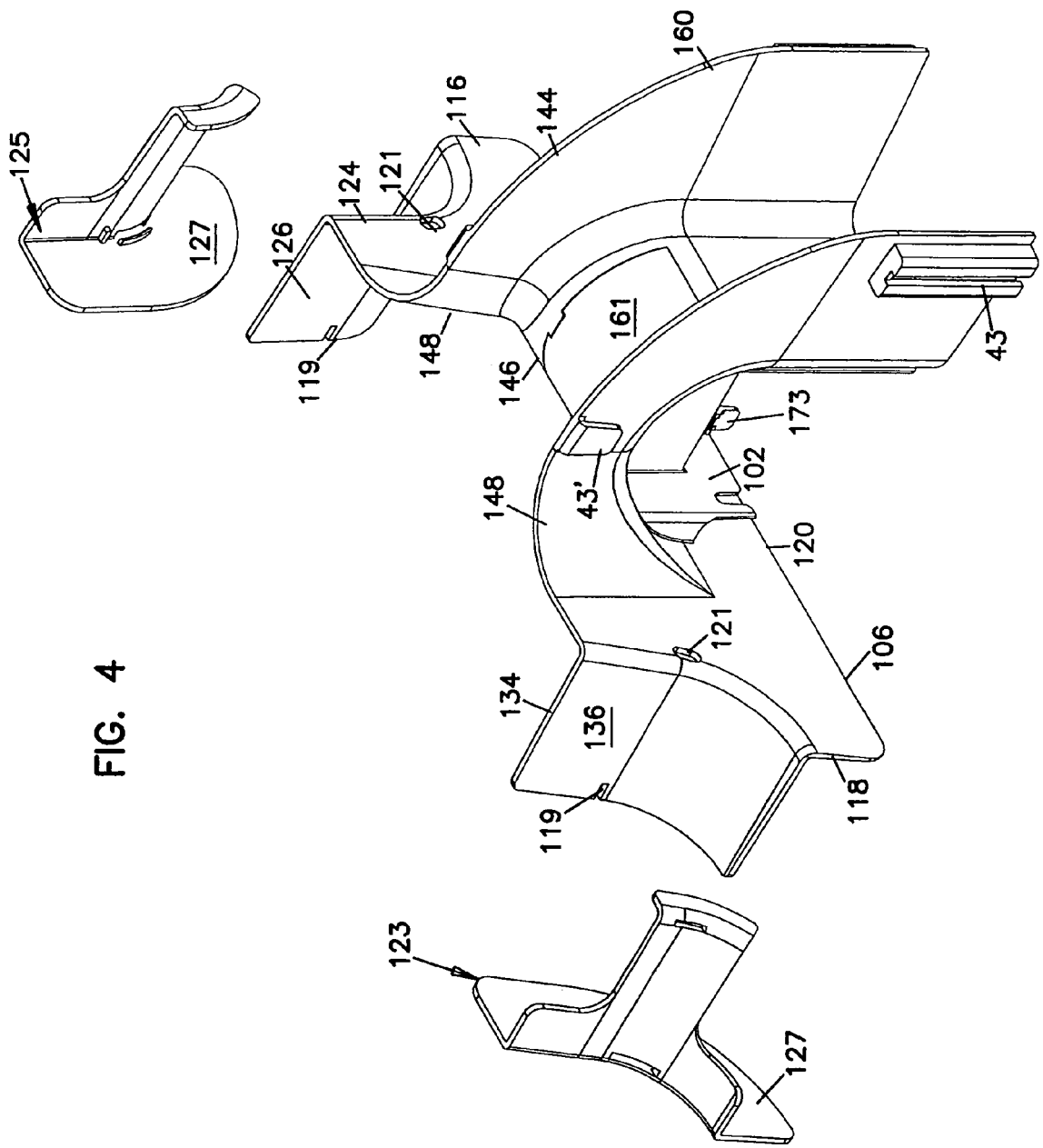
FIG. 4 is a perspective view of an exit trough according to the present invention with two flanges shown removed from the trough.
Figure 4A:
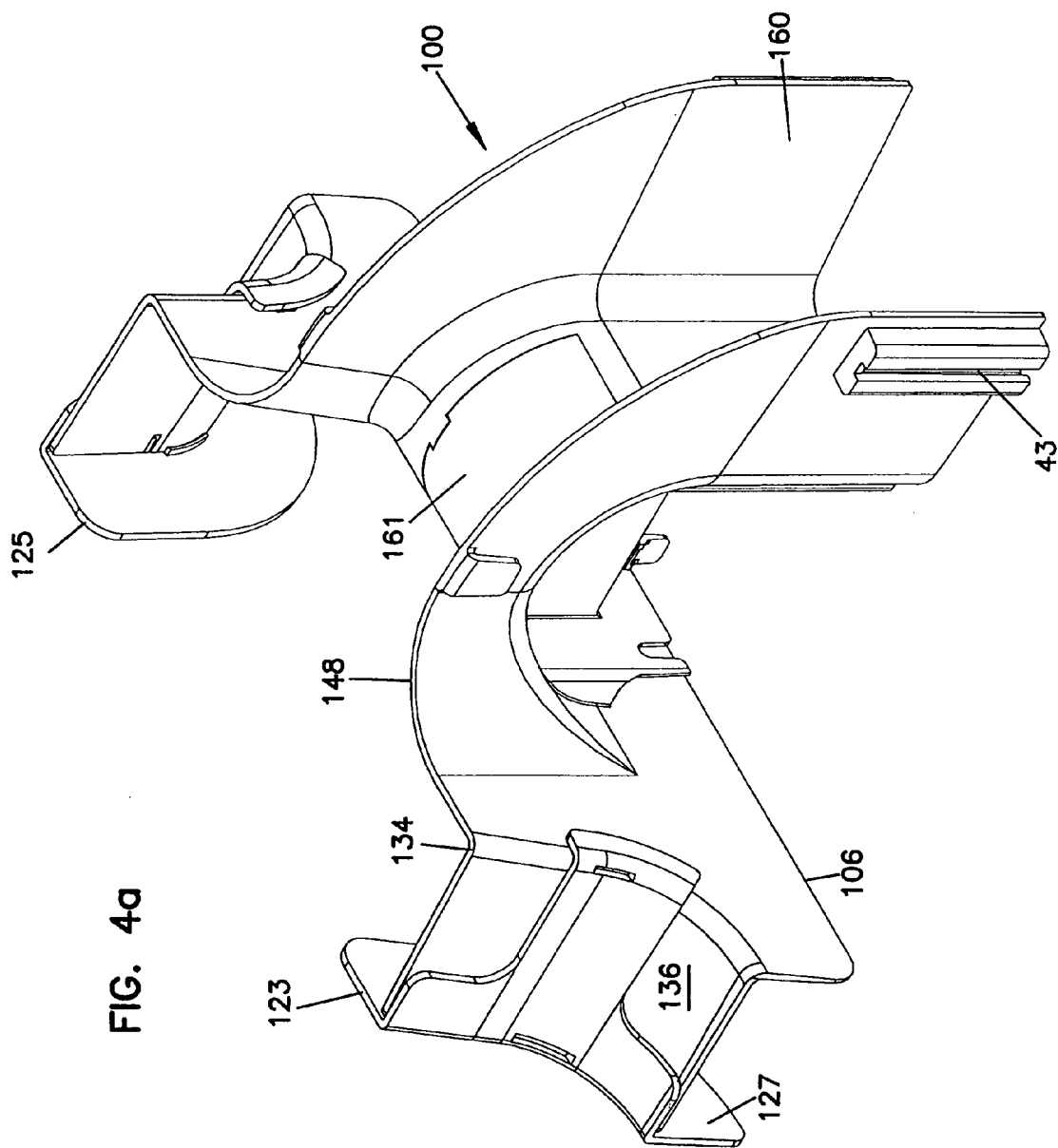
FIG. 4a is a perspective view of the exit trough of FIG. 4 showing both flanges attached to the exit trough.
Figure 8:
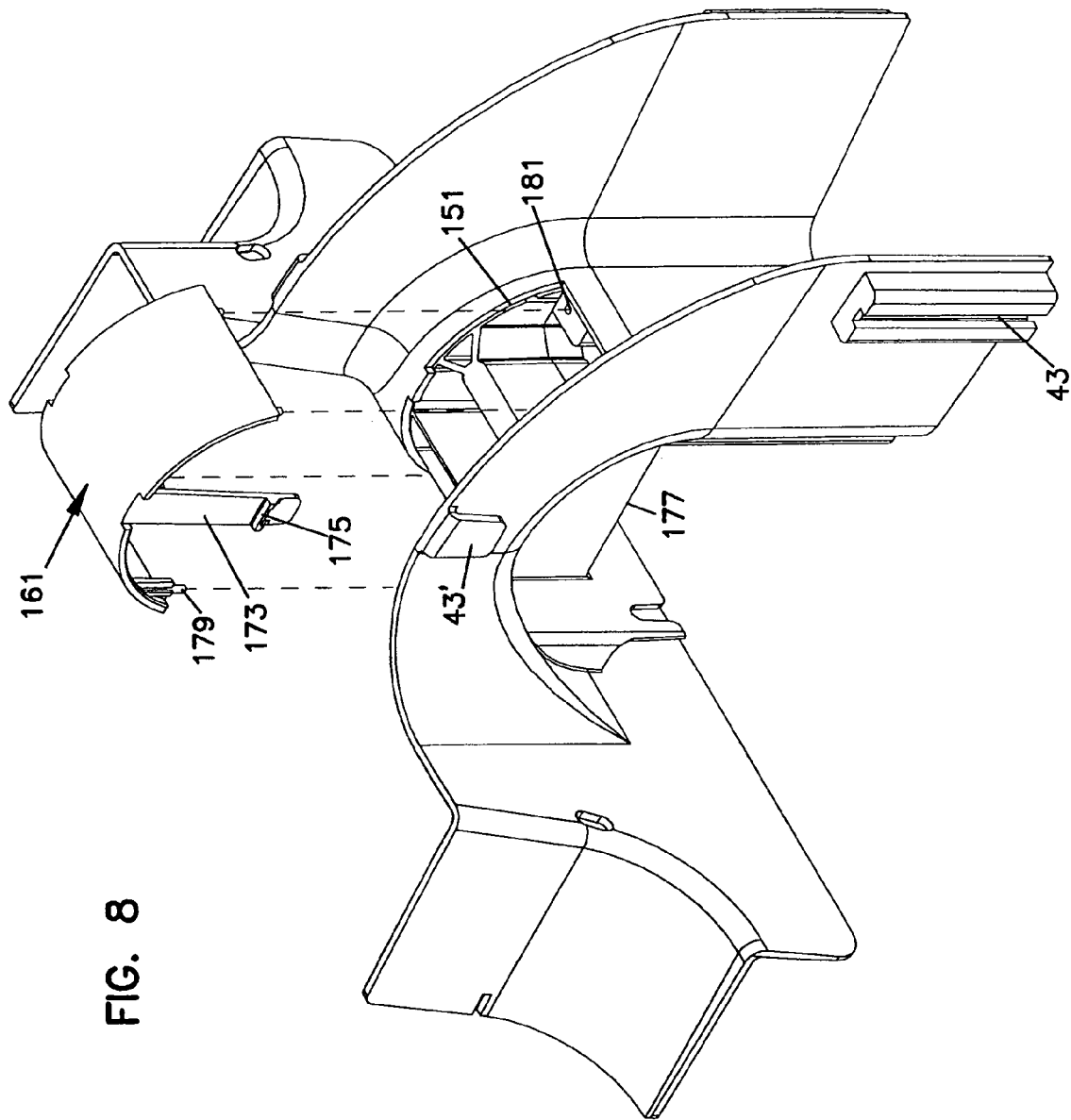
FIG. 8 is a perspective view of an exit trough according to the present invention and showing a removed modular insert piece.
Figure 15:
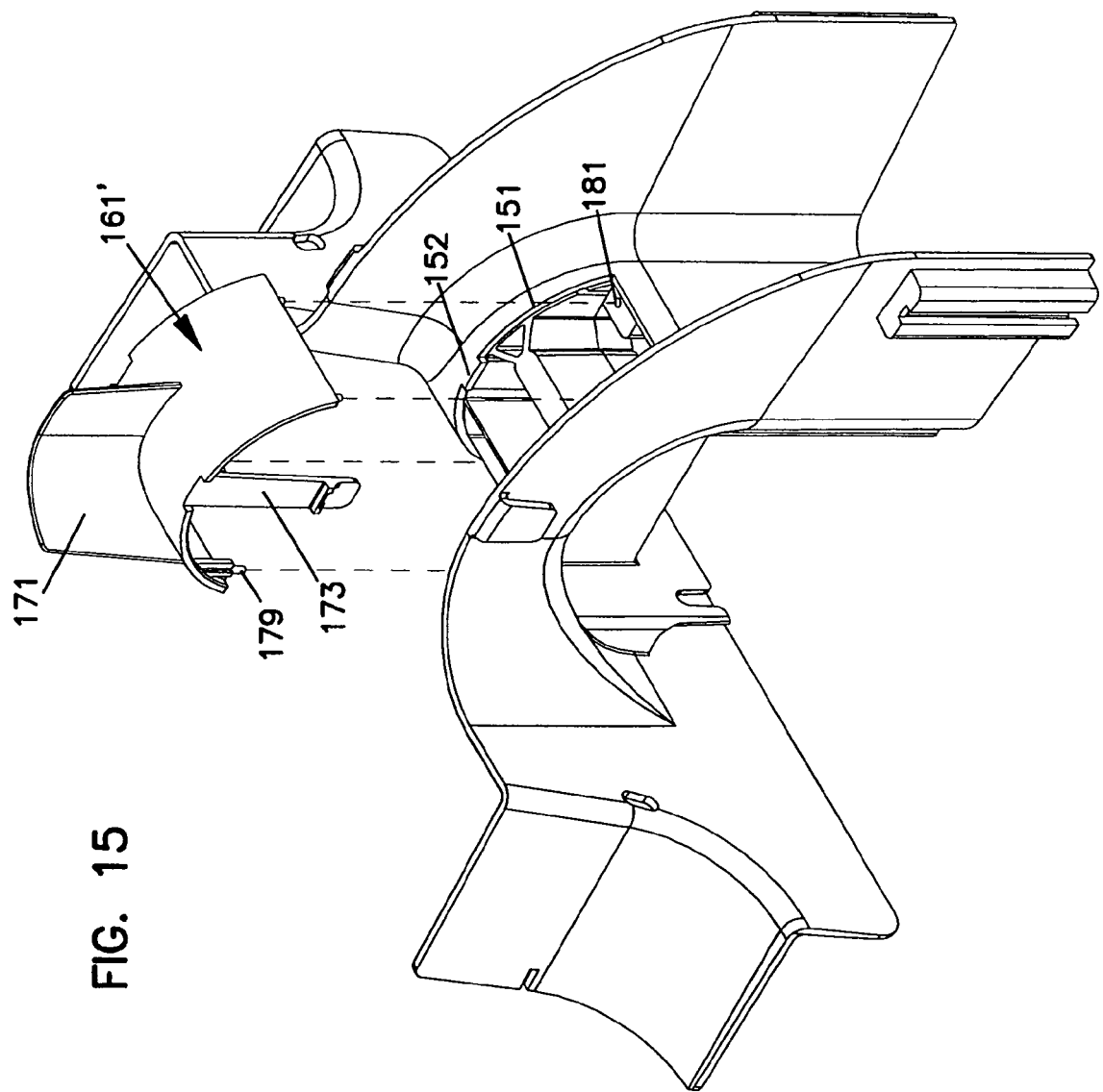
FIG. 15 is a perspective view of an exit trough according to the present invention and showing a removed modular insert piece with guidewall that curves in a first direction as it leads toward the downspout.
Figure 18:
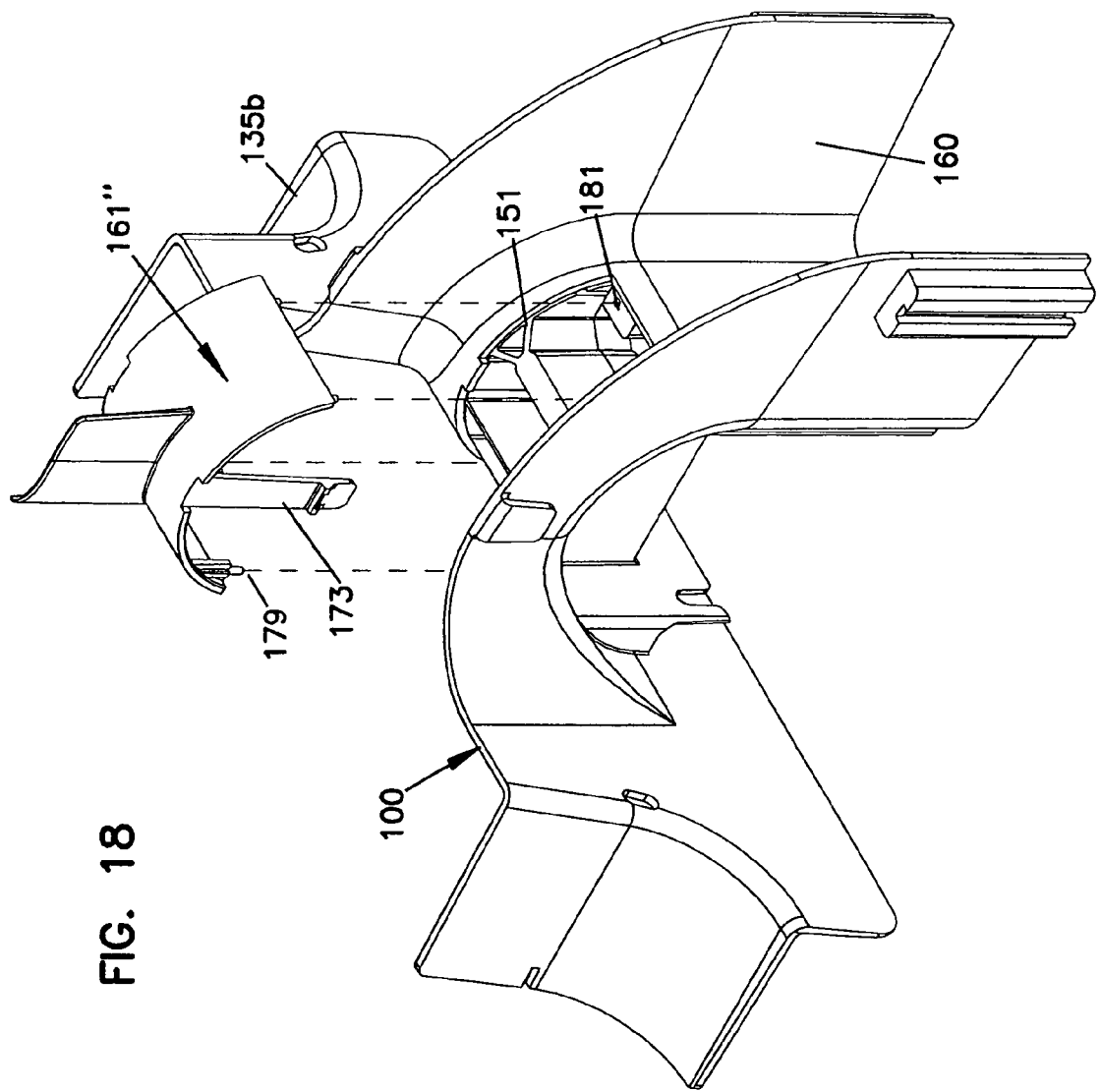
FIG. 18 is a perspective view of an exit trough according to the present invention and showing a removed modular insert piece with guidewall that curves in a second direction as it leads toward the downspout.
Figure 21:
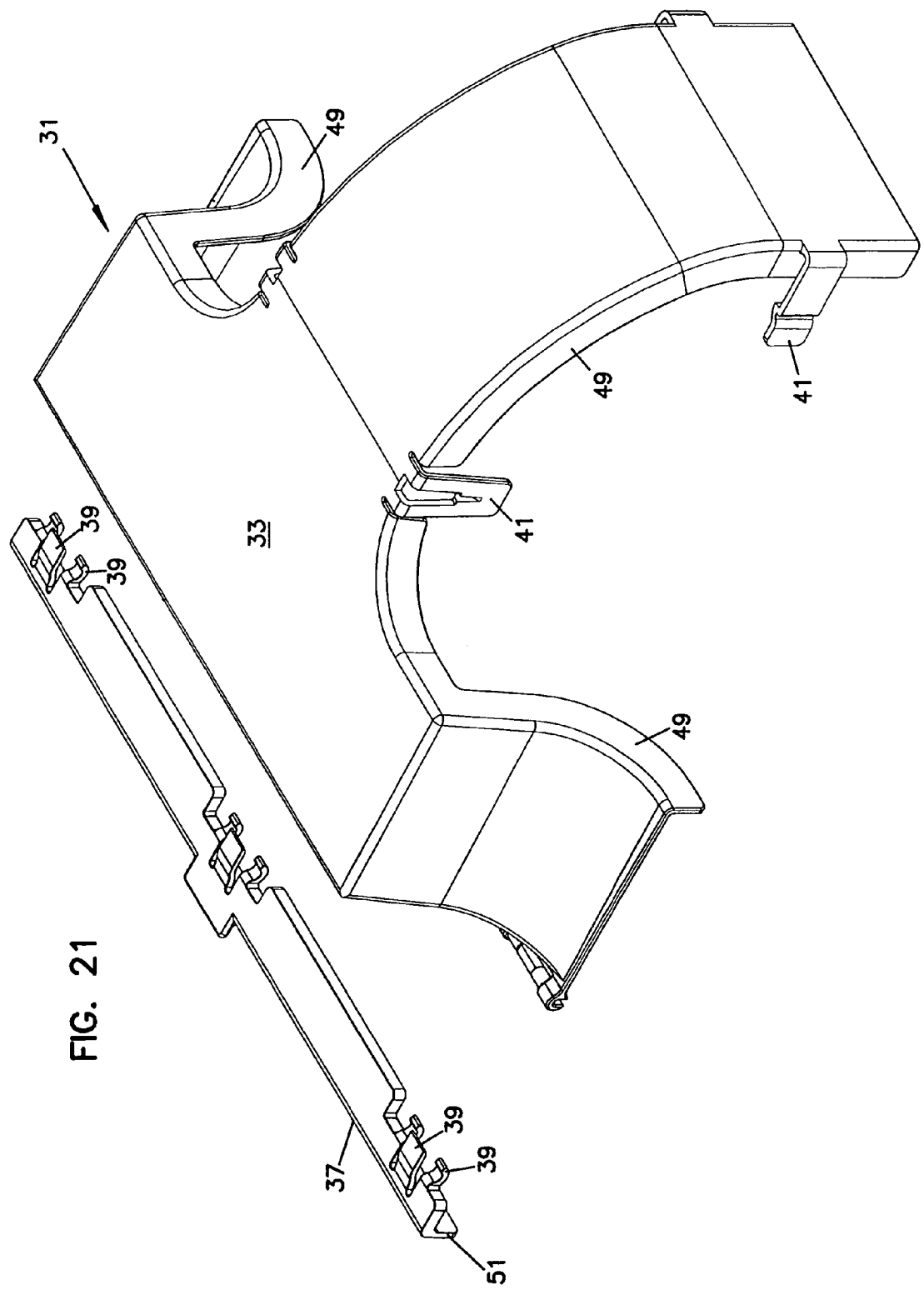
FIG. 21 is a disassembled perspective view of an exit cover according to the present invention.
Figure 22:
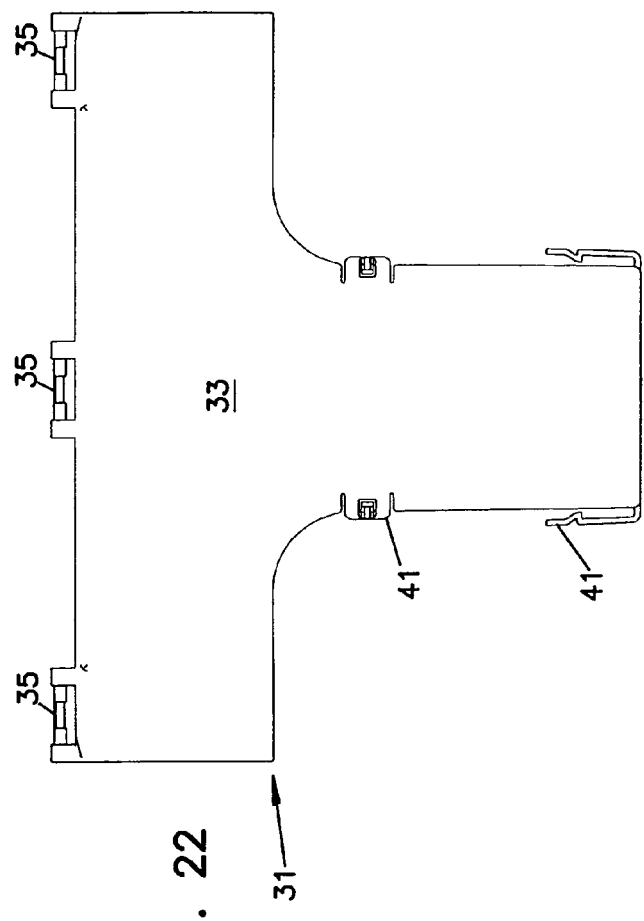
FIG. 22 is a top view of a cover plate according to the present invention.
Figure 23:
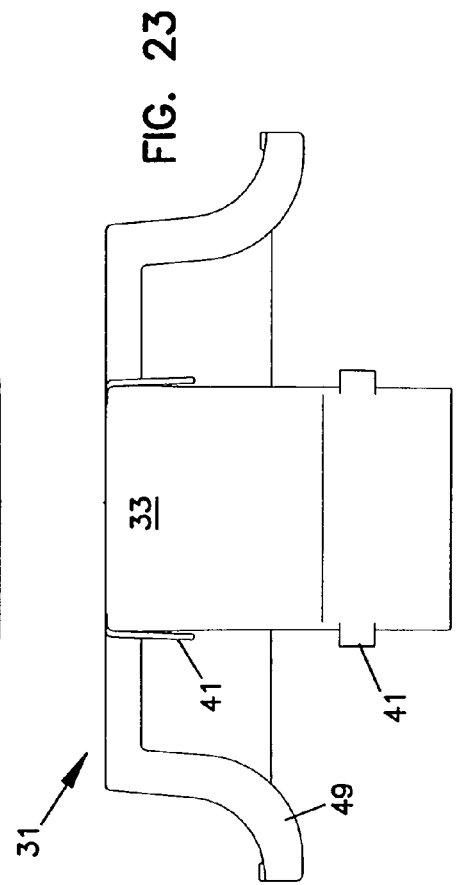
FIG. 23 is a front view of the cover plate of FIG. 22.
Figure 24:
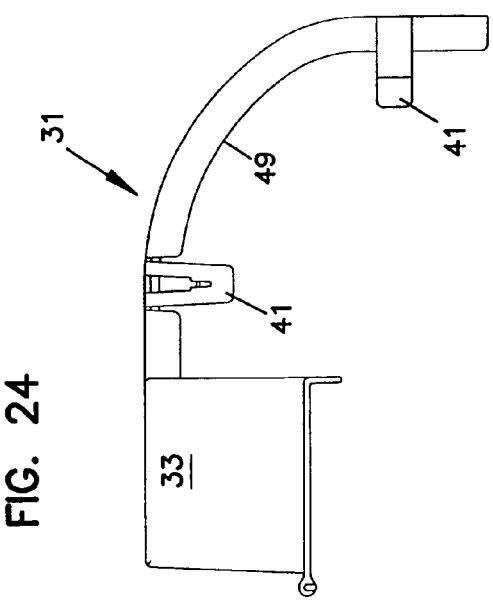
FIG. 24 is a side view of the cover plate of FIG. 22.

For protection of the optical fiber cables, inner projecting member 106 of bracket portion 102 is tapered. As shown in FIG. 4, bracket portion 102 generally extends from a first end 116 to a second end 118. A middle 120 is positioned between the first and second ends 116, 118. At first and second ends 116, 118, two cable lead-ins 124, 134 are provided. First lead-in 124 includes an upper surface portion 126 having an upwardly curved shape. Second lead-in 134 at an opposite end of bracket portion 102 faces in an opposite direction to first lead-in 124. Second lead-in 134 includes a similarly configured upwardly curved surface 136.

The two cable lead-ins 124 and 134 each define a slot 119 and hole 121 for receiving snap-mounted removable flanges 123 and 125. Flanges 123 and 125 each include a downwardly depending surface 127 which, when flanges 123 and 125 are snap-mounted to the lead-ins 124 and 134, define cable pathways between the flanges 123 and 125 and the inner projecting member 106 of the bracket portion 102 to assist with cable management. Flanges 123 and 125 are optional, and provide a downwardly depending flange structure to assist with cable management and retention of the cable when desired. Flanges 123 and 125 include posts or tabs 122 which are received by the slot 119 and hole 121 of the cable lead-ins for snap-mounting of the flanges 123 and 125. The flanges 123 and 125 may also include an alignment rail 122' to assist in mounting the flange to the exit trough 100.

Exit trough 100 includes an exit trough portion 144 extending from bracket portion 102 at middle 120 away from lateral trough section 20. Exit trough portion 144 includes a bottom trough surface 146 and upstanding sides 148 on opposite sides of bottom trough surface 146. Generally bottom trough surface 146 extends upwardly and away from top edge 30 of lateral trough section 20, and includes a convex shape. Upstanding sides 148 extend from each respective lead-in 124, 134, and also define convex shapes. Exit trough portion 144 defines a cable pathway linked to cable pathway 22 of lateral trough section 20 via cable pathways of the lead-ins 124, 134.

In exit trough 100, exit trough portion 144 links lateral trough section 20 to a downspout 160. Downspout 160 generally provides a cable pathway for cable exiting in a downward direction relative to lateral trough section 20.

Significantly, the bottom trough surface 146 may define an insert aperture 151. The insert aperture is configured to receive a removable modular insert piece 161. The insert aperture 151 may receive modular inserts each having different cable management components. For instance, as seen in FIGS. 4, 4a and 6-12, an insert piece 161 may simply be flat, having no cable management component. Alternatively, the insert piece (as seen in FIGS. 15-20) may have an upstanding guidewall 171 for arranging cables as they pass from the lateral trough to the exit trough. The guidewall 171 may be curved so as to manage and protect the cable being guided. The guidewall 171 helps keep the cables from bunching up, such as may occur as greater and greater numbers of cables exit the trough 20. It may be advantageous in some situations for the guidewall to curve in a first direction from end 135*a* of the exit trough as it leads toward the downspout, and in other situations it may be advantageous for the guidewall to curve in an opposite direction from opposite end 135*b* toward downspout 160. Therefore, an insert piece may be configured to have a guidewall 171 that curves from end 135*a* toward downspout 160 (shown in FIGS. 15-17 as insert 161'), or alternatively from end 135*b* (shown in FIGS. 18-20 as insert 161") With an exit trough having an insert aperture 151, the exit trough may be assembled quickly and easily with the desired configuration. Further, the exit rough can be quickly and easily modified to meet changing needs.

Referring now to FIGS. 8-12, modular insert piece 161 includes a curved major surface 163 having a first convex side 165 and a second concave side 167. The major surface 163 has edges 169. The insert piece 161 includes guide tabs 173 extending from two edges of the major surface 163 on the concave side 167 of the major surface. The guide tabs 173 may each include a detent ridge 175 configured to engage a retaining wall 177 of the cable exit trough. Notches 174 mate with protrusions 152 on the cable exit trough. The modular insert piece 161 may also include a plurality of alignment pins 179 protruding from the concave side 167 of the major surface 163. The alignment pins 179 are spaced to be received by alignment holes 181 in the cable exit trough seen in FIGS. 8, 13, 15 and 18. The guide tabs 173 protrude below exit trough 100, to provide structure to release insert piece 161 so the insert piece can be changed as desired.

As shown in FIGS. 17 and 20, bottom trough surface 146 may include an upstanding guidewall 171 dividing the cable pathway of the exit trough portion 144 for improving cable management. The guidewall 171 preferably is curved to prevent damage to the cable. The guidewall may be incorporated into an insert piece or may be formed directly on the bottom trough surface 146.

With exit trough 100 mounted to lateral trough section 20, cable extending generally horizontally to the ground through lateral trough section 20 is allowed to route upwardly and away from lateral trough section 20, and then to route downwardly through downspout 160 for connection to optical transmission equipment, or other uses. Downspout 160 is connectable via any suitable means to other cable routing components, such as vertical troughs or conduit, as desired. The various curves provided with exit trough 100 help protect the optical fiber cables from being bent beyond a minimum radius of curvature.

The disclosed exit trough 100 allows for exit pathways from the lateral trough section 20 without modification to the lateral trough section 20. This is useful during initial system setup, and also during modifications of the system at later dates. Exit trough 100 can be added at any time quickly and easily. Cable damage is avoided since any cables in lateral trough section 20 are not disturbed and do not have to be moved when exit troughs 100 are added. Also, fasteners are all that is needed to mount the preferred bracket portion 102 of the exit trough 100 to the lateral trough section 20. In addition to the downspout 160 other directional components are possible from exit trough portions 144 of exit trough 100 such as horizontal portions which lead horizontally away from the lateral trough instead of vertically.

The preferred embodiments of exit trough 100 also include an exit cover 31. The cover 31 prevents dust and other foreign material from falling into or collecting inside the exit trough and lateral trough while allowing easy access to the troughs. As shown in FIGS. 21-26, the exit cover 31 includes a cover plate 33. The cover plate 33 is sized and shaped to cover the cable pathways of the lead-ins 124 and 134 as well as the cable pathway of the exit trough portion 144 and the lateral trough 20. The cover plate 33 is configured with hinge posts 35. The cover 31 includes a pivoting door or pivot plate 37. The pivot plate 37 defines hinge tabs 39 for rotatably receiving the hinge posts 35 of the cover plate 33. Alternatively, the cover plate 33 may be configured with the hinge tabs 39 and the pivot plate 37 may be configured with the hinge posts 35 to be received by the hinge tabs 39 of the cover plate 33. The hinge posts 35 and hinge tabs 39 define a hinge axis which is parallel to the lateral trough section 20.

The cover plate 33 includes retention tabs or clips 41 which in combination with detent grooves 43 or clips 43' in the exit trough secure the exit cover 31 to the exit trough 100. The cover plate 33 includes downward outer lips 49, and the pivot plate includes a downward outer lip 51 to surround and protect lateral trough section 20 and exit trough 100. The cover plate 33 is roughly t-shaped with the post of the "T" curving downward to cover the downspout 160. Cover plate 33 includes sidewalls 33' to cover the lead-ins of the exit trough 100. In addition, as shown in FIGS. 29-31, the pivot plate 37 may be made in varying sizes for covering larger or smaller lateral troughs.

Figure 25:
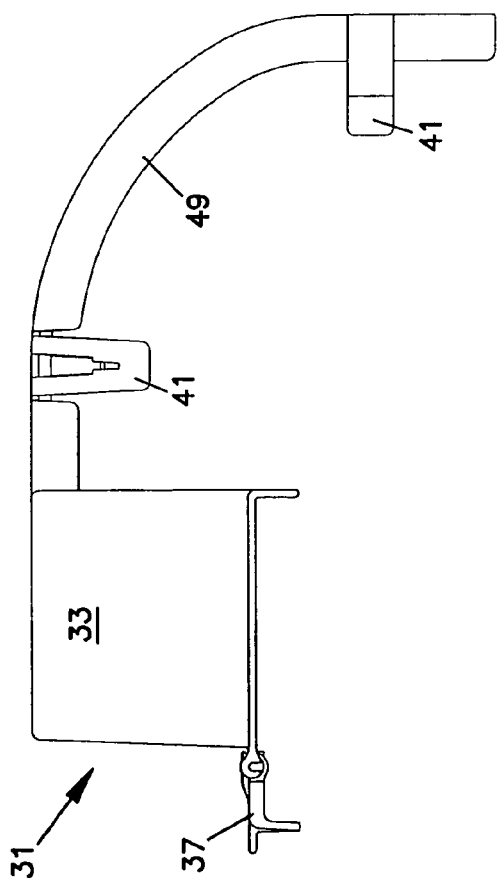
FIG. 25 is a side view of an exit cover according to the present invention showing the pivot plate in a closed position.
Figure 26:
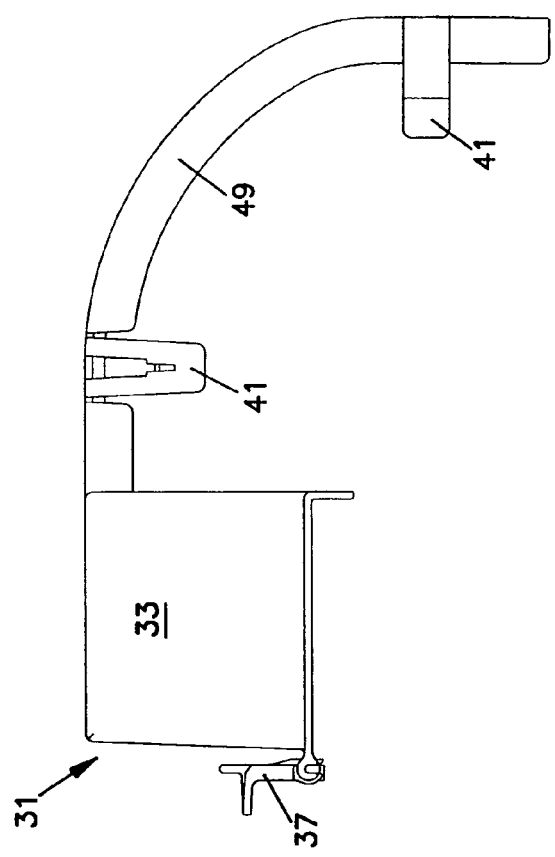
FIG. 26 is a side view of the exit cover of FIG. 25 showing the pivot plate in an open position.
Figure 33:
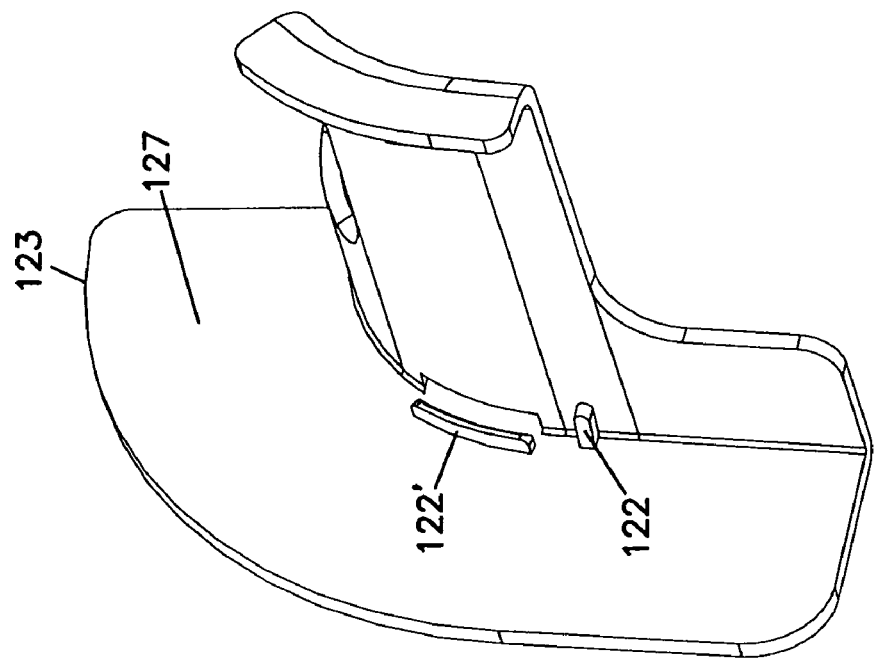
FIG. 33 is a second perspective view of the flange of FIG. 32.
Figure 32:
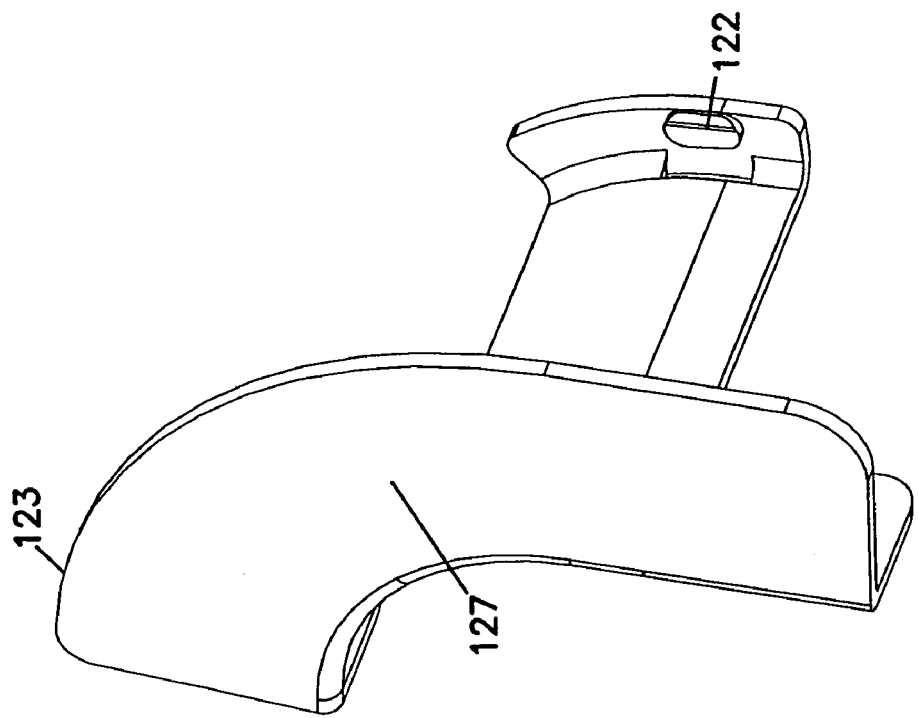
FIG. 32 is a first perspective view of a removable flange according to the present invention.

The pivot plate 37 may be pivoted relative to the cover plate 33 between an open position as shown in FIG. 26 and a closed position as shown in FIG. 25. When the pivot plate 37 is in the open position relative to the cover plate 33, an access port is created between the upstanding side 26 of the lateral trough section and the cover plate 33, thereby allowing insertion or removal of cables from the trough. In this way, cables may be inserted or removed to or from the lateral trough without the cumbersome step of completely removing the entire cover 31 from the exit trough 100. This often occurs when a new downspout and exit trough is added for new cables. The upstream exit troughs can each be covered with a cover 31. Only the pivot plates 37 of the covers 31 need to be moved to drop in new cables.

Having described the present invention in its preferred embodiment, modifications and equivalents may occur to one skilled in the art. It is intended that such modifications and equivalents shall be included within the scope of the claims which are appended hereto.

What is claimed is:

1. A cable routing system, comprising:
  a.) a lateral trough section, the lateral trough section including an upstanding side having a substantially uniform height and terminating at a top edge, the lateral trough section defining a cable pathway; and
  b.) a cable exit assembly releasably mounted to the lateral trough section, the cable exit assembly including:
    i.) a curved cable supporting surface that defines a cable exit pathway leading away from the cable pathway when the cable exit assembly is mounted to the lateral trough section such that a user is permitted to route a cable over the upstanding side, the cable supporting surface being curved so as not to violate a minimum cable bend radius, wherein the curved cable supporting surface defines an aperture; and
    ii.) an insert positionable within the aperture of the curved cable supporting surface, the insert including a first surface extending upward relative to the curved cable supporting surface when the insert is positioned within the aperture, the first surface assisting in routing cables within the cable exit pathway.

2. The cable routing system of claim 1, wherein the cable exit assembly is releasably mounted to the lateral trough section without cutting the upstanding side of the lateral trough section.

3. The cable routing system of claim 1, wherein the insert includes a first tab that secures the insert within the aperture.

4. The cable routing system of claim 3, wherein the insert includes a second tab, and wherein the first and second tabs extend below and are accessible underneath the cable supporting surface when the insert is positioned within the aperture.

5. The cable routing system of claim 1, wherein the first surface is defined by a guidewall extending generally in the direction of the cable exit pathway.

6. The cable routing system of claim 1, the cable exit assembly further including a cover having a cover surface over the cable exit pathway.

7. The cable routing system of claim 1, further including two side surfaces adjacent opposite side portions of the curved cable supporting surface.

8. The cable routing system of claim 7, wherein the two side surfaces are integrally formed with the cable supporting surface.

9. The cable routing system of claim 1, wherein the insert includes a second surface that is positioned within the aperture, and wherein the first surface extends upward from the second surface.

10. The cable routing system of claim 9, wherein the second surface is curved and has a curvature corresponding to the curvature of the cable supporting surface.

11. The cable routing system of claim 1, wherein the first surface is curved.

12. The cable routing system of claim 1, wherein the first surface divides at least a portion of the cable exit pathway.

13. The cable routing system of claim 7, wherein the first surface is substantially parallel to an adjacent portion of either of the two side surfaces.

14. The cable routing system of claim 1, wherein the cable supporting surface extends from a point within the lateral trough section to a point outside the lateral trough section.

15. The cable routing system of claim 1, wherein the cable exit assembly includes first and second flanges substantially parallel to and spaced inwardly from the upstanding side when the cable exit assembly is mounted to the lateral trough section.

16. The cable routing system of claim 7, wherein the two side surfaces include curved portions that assist in defining the cable exit pathway.

17. The cable routing system of claim 7, wherein the cable supporting surface includes a substantially vertical portion outside the lateral trough section, and wherein the two side surfaces are adjacent opposite sides of the substantially vertical portion of the cable supporting surface.

18. The cable routing system of claim 1, wherein the cable routing system includes at least one additional surface positioned over a bottom surface of the lateral trough section and spaced from the cable supporting surface to allow cables to pass between the at least one additional surface and the cable supporting surface when the cable exit assembly is mounted to the lateral trough section.

19. The cable routing system of claim 18, wherein the at least one additional surface is a downwardly depending flange spaced from the cable supporting surface by a curved lead-in surface.

20. A cable routing system, comprising:
a.) a lateral trough section defining a cable pathway, the lateral trough section including an upstanding side having a substantially uniform height and terminating at a top edge; and
b.) a cable exit assembly releasably mounted to the lateral trough section, the cable exit assembly including:
i.) a curved bottom surface defining an exit pathway leading from a point adjacent the top edge away from the cable pathway when the cable exit assembly is mounted to the lateral trough section, wherein a cable passes over the top edge of the lateral trough section when routed in the exit pathway, the curved bottom surface defining an aperture for receiving an insert; and
ii.) a cover positioned over at least a portion of the bottom surface, wherein when the cover is positioned over the bottom surface the cable exit assembly includes first and second side surfaces positioned adjacent opposite sides of the bottom surface.

21. The cable routing system of claim 20, wherein the cable exit assembly is releasably mounted to the lateral trough section without cutting the upstanding side of the lateral trough section.

22. The cable routing system of claim 20, further including an insert positioned within the aperture, the insert including a first surface, wherein when the insert is positioned within the aperture the first surface extends upward relative to the curved bottom surface at an intermediate position between the first and second side surfaces.

23. The cable routing system of claim 22, wherein the insert includes a first tab that secures the insert within the aperture.

24. The cable routing system of claim 23, wherein the insert includes a second tab, and wherein the first and second tabs extend below and are accessible underneath the bottom surface when the insert is positioned within the aperture.

25. The cable routing system of claim 22, wherein the first surface is defined by a guidewall extending generally in the direction of the exit pathway.

26. The cable routing system of claim 20, wherein the first and second side surfaces are integrally formed with the bottom surface.

27. The cable routing system of claim 22, wherein the insert includes a second surface that is positioned within the aperture, and wherein the first surface extends upward from the second surface.

28. The cable routing system of claim 27, wherein the second surface is curved and has a curvature corresponding to the curvature of the bottom surface.

29. The cable routing system of claim 22, wherein the first surface is curved.

30. The cable routing system of claim 22, wherein the first surface divides at least a portion of the exit pathway.

31. The cable routing system of claim 22, wherein the first surface is substantially parallel to an adjacent portion of either of the first or second side surfaces.

32. The cable routing system of claim 20, wherein the bottom surface extends from a point within the lateral trough section to a point outside the lateral trough section.

33. The cable routing system of claim 20, wherein the cable exit assembly includes first and second flanges substantially parallel to and spaced inwardly from the upstanding side when the cable exit assembly is mounted to the lateral trough section.

34. The cable routing system of claim 20, wherein each of the first and second side surfaces includes a curved portion.

35. The cable routing system of claim 20, wherein the bottom surface includes a substantially vertical portion outside the lateral trough section, and wherein the first and second side surfaces are adjacent opposite sides of the substantially vertical portion of the bottom surface.

36. The cable routing system of claim 20, wherein the cable routing system includes at least one additional surface positioned over a bottom surface of the lateral trough section and spaced from the bottom surface of the cable exit assembly to allow cables to pass between the at least one additional surface and the cable exit assembly bottom surface when the cable exit assembly is mounted to the lateral trough section.

37. The cable routing system of claim 36, wherein the at least one additional surface is a downwardly depending flange spaced from the bottom surface by a curved lead-in surface.

38. A cable routing system, comprising:
   a.) a cable exit component mountable to a lateral trough section, the lateral trough section defining a cable pathway and having an upstanding side of substantially uniform height and terminating at a top edge, the cable exit component releasably mountable to the lateral trough section, the cable exit component including a curved cable supporting surface defining an exit pathway, wherein when the cable exit component is mounted to the lateral trough section the exit pathway extends transversely over the upstanding side of the lateral trough section; and
   b.) a guidewall extending upward relative to the cable supporting surface and oriented generally in the direction of the exit pathway, the guidewall being spaced inwardly from a side portion of the curved cable supporting surface;
   c.) wherein the curved cable supporting surface defines an aperture, and wherein the cable routing system further includes an insert positioned within the aperture, and wherein the guidewall is formed on the insert.

39. The cable routing system of claim 38, wherein the cable exit component is releasably mountable to the lateral trough section without cutting the upstanding side of the lateral trough section.

40. The cable routing system of claim 38, further including a lateral trough section, the lateral trough section including an upstanding side having a substantially uniform height and terminating at a top edge, the lateral trough section defining a cable pathway.

41. The cable routing system of claim 38, wherein the insert includes a first tab that secures the insert within the aperture.

42. The cable routing system of claim 41, wherein the insert includes a second tab, and wherein the first and second tabs extend below and are accessible underneath the cable supporting surface when the insert is positioned within the aperture.

43. The cable routing system of claim 38, further including a cover having a cover surface over the exit pathway.

44. The cable routing system of claim 38, further including two side surfaces adjacent opposite side portions of the curved cable supporting surface.

45. The cable routing system of claim 44, wherein the two side surfaces are integrally formed on the cable exit component.

46. The cable routing system of claim 38, wherein the insert includes a base surface that is positioned within the aperture, and wherein the guidewall extends upward from the base surface.

47. The cable routing system of claim 46, wherein the base surface is curved and has a curvature corresponding to the curvature of the cable supporting surface.

48. The cable routing system of claim 38, wherein the guidewall is curved.

49. The cable routing system of claim 44, wherein the guidewall is substantially parallel to an adjacent portion of either of two side surfaces.

50. The cable routing system of claim 38, wherein the cable supporting surface extends from a point within the lateral trough section to a point outside the lateral trough section.

51. The cable routing system of claim 38, wherein the cable exit component includes first and second flanges substantially parallel to and spaced inwardly from the upstanding side when the cable exit component is mounted to the lateral trough section.

52. The cable routing system of claim 44, wherein each of the two side surfaces includes a curved portion that assists in defining the exit pathway.

53. The cable routing system of claim 44, wherein the cable supporting surface includes a substantially vertical portion outside the lateral trough section, and wherein the two side surfaces are adjacent opposite sides of the substantially vertical portion of the cable supporting surface.

54. The cable routing system of claim 38, wherein the cable routing system includes at least one additional surface positioned over a bottom surface of the lateral trough section and spaced from the cable supporting surface to allow cables to pass between the at least one additional surface and the cable supporting surface when the cable exit component is mounted to the lateral trough section.

55. The cable routing system of claim 54, wherein the at least one additional surface is a downwardly depending flange spaced from the cable supporting surface by a curved lead-in surface.

56. A cable routing system, comprising:
   a.) a lateral trough section, the lateral trough section including an upstanding side having a substantially uniform height and terminating at a top edge; and
   b.) a cable exit assembly including:
      i.) a curved bottom surface that defines an exit pathway for routing a plurality of cables over the top edge, the bottom surface sufficiently curved so as not to violate a minimum cable bend radius, the bottom surface including a first curved portion leading upwardly with respect to the lateral trough section and a second curved portion leading downwardly with respect to the lateral trough section;
      ii.) two side surfaces positioned adjacent opposite sides of the bottom surface; and
      iii.) a first surface positioned between the two side surfaces to assist in routing cables within the cable exit assembly;
   c.) wherein the curved bottom surface defines an aperture, and wherein the cable routing system further includes an insert positioned within the aperture, and wherein the first surface is formed on the insert.

57. The cable routing system of claim 56, wherein the cable exit assembly is releasably mounted to the lateral trough section without cutting the upstanding side of the lateral trough section.

58. The cable routing system of claim 56, wherein the insert includes a first tab that secures the insert within the aperture.

59. The cable routing system of claim 58, wherein the insert includes a second tab, and wherein the first and second tabs extend below and are accessible underneath the bottom surface when the insert is positioned within the aperture.

60. The cable routing system of claim 56, wherein the first surface is defined by a guidewall extending generally in the direction of the exit pathway.

61. The cable routing system of claim 56, the cable exit assembly further including a cover having a cover surface over the exit pathway.

62. The cable routing system of claim 56, wherein the two side surfaces are integrally formed with the bottom surface.

63. The cable routing system of claim 56, wherein the insert includes a second surface that is positioned within the aperture, and wherein the first surface extends upward from the second surface.

64. The cable routing system of claim 63, wherein the second surface is curved and has a curvature corresponding to the curvature of the bottom surface.

65. The cable routing system of claim 56, wherein the first surface is curved.

66. The cable routing system of claim 56, wherein the first surface is substantially parallel to an adjacent portion of either of two side surfaces.

67. The cable routing system of claim 56, wherein the bottom surface extends from a point within the lateral trough section to a point outside the lateral trough section.

68. The cable routing system of claim 56, wherein the cable exit assembly includes first and second flanges substantially parallel to and spaced inwardly from the upstanding side when the cable exit assembly is mounted to the lateral trough section.

69. The cable routing system of claim 56, wherein each of the two side surfaces includes a curved portion.

70. The cable routing system of claim 56, wherein the bottom surface includes a substantially vertical portion outside the lateral trough section, and wherein the two side surfaces are adjacent opposite sides of the substantially vertical portion of the bottom surface.

71. The cable routing system of claim 56, wherein the cable routing system includes at least one additional surface positioned over a bottom surface of the lateral trough section and spaced from the curved bottom surface of the cable exit assembly to allow cables to pass between the at least one additional surface and the bottom surface when the cable exit assembly is mounted to the lateral trough section.

72. The cable routing system of claim 71, wherein the at least one additional surface is a downwardly depending flange spaced from the curved bottom surface by a curved lead-in surface.

73. A cable routing system, comprising:
  a.) a lateral trough section including an upstanding side having substantially uniform height and terminating at a top edge;
  b.) a transitional cable routing component, the component being releasably mountable to the lateral trough section, the transitional cable routing component including a curved cable supporting surface defining an exit pathway extending from the top edge transversely away from the lateral trough section, the cable supporting surface being curved so as not to violate a minimum cable bend radius; and
  c.) an insert mounted to the transitional cable routing component, the insert including a guidewall positioned within the exit pathway to divide at least a portion of the exit pathway;
  d.) wherein the curved cable supporting surface defines an aperture, and wherein the insert is positioned within the aperture.

74. The cable routing system of claim 73, wherein the transitional cable routing component is releasably mountable to the lateral trough section without cutting the upstanding side of the lateral trough section.

75. The cable routing system of claim 73, wherein the insert includes a first tab that secures the insert within the aperture.

76. The cable routing system of claim 75, wherein the insert includes a second tab, and wherein the first and second tabs extend below and are accessible underneath the cable supporting surface when the insert is positioned within the aperture.

77. The cable routing system of claim 73, wherein the guidewall extends generally in the direction of the exit pathway.

78. The cable routing system of claim 73, further including a cover, the cover having a cover surface over the exit pathway.

79. The cable routing system of claim 73, further including two side surfaces adjacent opposite side portions of the curved cable supporting surface.

80. The cable routing system of claim 79, wherein the two side surfaces are integrally formed with the curved cable supporting surface.

81. The cable routing system of claim 73, wherein the insert includes a base surface that is positioned within the aperture, and wherein the guidewall extends upward from the base surface.

82. The cable routing system of 81, wherein the base surface is curved and has a curvature corresponding to the curvature of the cable supporting surface.

83. The cable routing system of 73, wherein the guidewall is curved.

84. The cable routing system of claim 79, wherein the guidewall is substantially parallel to an adjacent portion of either of the two side surfaces.

85. The cable routing system of claim 73, wherein the cable supporting surface extends from a point within the lateral trough section to a point outside the lateral trough section.

86. The cable routing system of claim 73, wherein the transitional cable routing component includes first and second flanges substantially parallel to and spaced inwardly from the upstanding side when the transitional cable routing component is mounted to the lateral trough section.

87. The cable routing system of claim 79, wherein each of the two side surfaces includes a curved portion.

88. The cable routing system of claim 73, wherein the cable supporting surface includes a substantially vertical portion outside the lateral trough section, and wherein the two side surfaces are adjacent opposite sides of the substantially vertical portion.

89. The cable routing system of claim 73, wherein the cable routing system includes at least one additional surface positioned over a bottom surface of the lateral trough section and spaced from the curved cable supporting surface to allow cables to pass between the at least one additional surface and the cable supporting surface when the transitional cable routing component is mounted to the lateral trough section.

90. The cable routing system of claim 89, wherein the at least one additional surface is a downwardly depending flange spaced from the cable supporting surface by a curved lead-in surface.

* * * * *